US008579702B2

(12) United States Patent
Oatman et al.

(10) Patent No.: US 8,579,702 B2
(45) Date of Patent: Nov. 12, 2013

(54) GAMING SYSTEM HAVING TOOLS FOR CATEGORIZING WAGERS AND METERING PERFORMANCE OF WAGERING GAMES AND SUPPLEMENTAL FEATURES

(75) Inventors: James E. Oatman, Arlington Heights, IL (US); Mark J. Saletnik, Mount Prospect, IL (US); Jason A. Smith, Vernon Hills, IL (US)

(73) Assignee: WMS Gaming Inc., Waukegan, IL (US)

( * ) Notice: Subject to any disclaimer, the term of this patent is extended or adjusted under 35 U.S.C. 154(b) by 187 days.

(21) Appl. No.: 12/741,644

(22) PCT Filed: Nov. 7, 2008

(86) PCT No.: PCT/US2008/012590

§ 371 (c)(1), (2), (4) Date: May 6, 2010

(87) PCT Pub. No.: WO2009/061479

PCT Pub. Date: May 14, 2009

(65) Prior Publication Data

US 2010/0261521 A1 Oct. 14, 2010

Related U.S. Application Data

(60) Provisional application No. 61/002,751, filed on Nov. 9, 2007.

(51) Int. Cl.
*A63F 13/00* (2006.01)

(52) U.S. Cl.
USPC .................. 463/25; 463/16; 463/17; 463/18; 463/19; 463/20; 463/40; 463/41; 463/42

(58) Field of Classification Search
USPC ............................................. 463/16–23, 25
See application file for complete search history.

(56) References Cited

U.S. PATENT DOCUMENTS 4,679,143 A 7/1987 Hagiwara
5,083,271 A 1/1992 Thacher et al. ............... 341/411

(Continued)

FOREIGN PATENT DOCUMENTS

AU 5251830 12/2005
WO WO 2005/120672 A2 12/2005

(Continued)

OTHER PUBLICATIONS

Written Opinion corresponding to co-pending International Patent Application Serial No. PCT/US2008/012590, United States Patent Office; dated Jan. 30, 2009; 4 pages.

(Continued)

*Primary Examiner* — Ronald Laneau
*Assistant Examiner* — Justin Myhr
(74) *Attorney, Agent, or Firm* — Nixon Peabody LLP

(57) ABSTRACT

A method of operating a wagering game comprises receiving one or more configuration inputs to create at least one wagering game configuration. The at least one wagering game configuration comprises at least one base game and at least one portal game. The at least one base game is operable in response to receipt of a primary wager, the primary wager being within a range of allowable wagers. The range includes minimum and maximum allowable wagers. The at least one portal game having a set of eligibility criteria. The method further comprises creating a plurality of wager categories based upon the set of eligibility criteria and a size of the primary wager, activating participation in the at least one portal game if the set of eligibility criteria is satisfied, and metering the entire primary wager to a single wager category.

19 Claims, 19 Drawing Sheets

(56) References Cited

U.S. PATENT DOCUMENTS

| | | | | |
|---|---|---|---|---|
| 5,655,961 | A | 8/1997 | Acres et al. | 463/27 |
| 5,761,649 | A | 6/1998 | Hill | 705/27 |
| 5,851,149 | A | 12/1998 | Xidos et al. | 463/42 |
| RE37,885 | E | 10/2002 | Acres et al. | 463/42 |
| 6,645,077 | B2 | 11/2003 | Rowe | 463/42 |
| 6,802,778 | B1 * | 10/2004 | Lemay et al. | 463/42 |
| RE38,812 | E | 10/2005 | Acres et al. | 463/26 |
| 7,144,321 | B2 | 12/2006 | Mayeroff | 463/16 |
| 7,285,049 | B1 | 10/2007 | Luciano, Jr. et al. | 463/42 |
| 2004/0137982 | A1 * | 7/2004 | Cuddy et al. | 463/20 |
| 2005/0054419 | A1 | 3/2005 | Souza et al. | 463/20 |
| 2005/0187014 | A1 * | 8/2005 | Saffari et al. | 463/27 |
| 2005/0239542 | A1 * | 10/2005 | Olsen | 463/27 |
| 2006/0073887 | A1 | 4/2006 | Nguyen et al. | 463/27 |
| 2006/0073888 | A1 | 4/2006 | Nguyen et al. | 463/27 |
| 2006/0079310 | A1 * | 4/2006 | Friedman et al. | 463/16 |
| 2006/0142079 | A1 | 6/2006 | Ikehara et al. | 463/27 |
| 2006/0154730 | A1 * | 7/2006 | Okuniewicz | 463/43 |
| 2006/0178206 | A1 * | 8/2006 | Kraft et al. | 463/25 |
| 2006/0189367 | A1 * | 8/2006 | Nguyen et al. | 463/16 |
| 2006/0211493 | A1 * | 9/2006 | Walker et al. | 463/29 |
| 2007/0060314 | A1 | 3/2007 | Baerlocher et al. | 463/25 |
| 2007/0060321 | A1 | 3/2007 | Vasquez et al. | 463/27 |
| 2007/0072668 | A1 * | 3/2007 | Hein et al. | 463/16 |
| 2007/0191088 | A1 | 8/2007 | Breckner et al. | 463/20 |
| 2007/0218975 | A1 | 9/2007 | Iddings et al. | |
| 2007/0243934 | A1 * | 10/2007 | Little et al. | 463/40 |
| 2007/0259709 | A1 | 11/2007 | Kelly et al. | 463/20 |
| 2007/0293293 | A1 | 12/2007 | Baerlocher et al. | 463/16 |
| 2007/0298857 | A1 | 12/2007 | Schlottmann et al. | 463/16 |
| 2007/0298874 | A1 | 12/2007 | Baerlocher et al. | 463/27 |
| 2007/0298875 | A1 * | 12/2007 | Baerlocher et al. | 463/27 |
| 2008/0020830 | A1 | 1/2008 | Ikehara et al. | 463/27 |
| 2008/0020831 | A1 | 1/2008 | Ikehara et al. | 463/27 |
| 2008/0020832 | A1 | 1/2008 | Iddings et al. | 463/27 |
| 2008/0020833 | A1 | 1/2008 | Baerlocher et al. | 463/27 |
| 2008/0020834 | A1 | 1/2008 | Breckner et al. | 463/27 |
| 2008/0020846 | A1 | 1/2008 | Vasquez et al. | 463/42 |
| 2008/0045344 | A1 | 2/2008 | Schlottmann et al. | 463/42 |
| 2008/0064502 | A1 | 3/2008 | Schlottmann et al. | 463/42 |
| 2008/0070680 | A1 | 3/2008 | Baerlocher et al. | 463/27 |
| 2008/0070692 | A1 | 3/2008 | Schlottmann et al. | 463/42 |
| 2008/0070693 | A1 | 3/2008 | Schlottmann et al. | 463/42 |
| 2008/0070694 | A1 | 3/2008 | Schlottmann et al. | 463/42 |
| 2008/0070695 | A1 | 3/2008 | Baerlocher et al. | 463/42 |
| 2008/0076514 | A1 | 3/2008 | Baerlocher et al. | 463/20 |
| 2008/0076515 | A1 | 3/2008 | Baerlocher et al. | 463/20 |
| 2008/0076517 | A1 | 3/2008 | Baerlocher et al. | 463/20 |
| 2008/0076552 | A1 | 3/2008 | Baerlocher et al. | 463/31 |

FOREIGN PATENT DOCUMENTS

| | | | |
|---|---|---|---|
| WO | WO 2006/076185 | A2 | 7/2006 |
| WO | WO 2008/030904 | A2 | 3/2008 |

OTHER PUBLICATIONS

International Search Report corresponding to co-pending International Patent Application No. PCT/US2008/012590, United States Patent Office; dated Jan. 30, 2009; 2 pages.

* cited by examiner

TYPE: 5 Reel 15 Line denom 0.05

| WIN COMBINATIONS | | | | | Reel #1<br>89 1 | Reel #2<br>89 1 | Reel #3<br>89 1 |
|---|---|---|---|---|---|---|---|
| Jackpot TRIGGER (JACKPOT) | | | | | 2 | 1 | 6 |
| JACKPOT | JACKPOT | JACKPOT | JACKPOT | JACKPOT | 2 | 1 | 6 |
| JACKPOT | JACKPOT | JACKPOT | JACKPOT | ANY | 2 | 1 | 6 |
| JACKPOT | JACKPOT | JACKPOT | ANY | ANY | 2 | 1 | 6 |
| It's America's Game Logo (LOGO) [Wild for all except JACKPOT, SCRATCH, MATCH] | | | | | 3 | 1 | 1 |
| LOGO | LOGO | LOGO | LOGO | LOGO | 3 | 1 | 1 |
| LOGO | LOGO | LOGO | LOGO | ANY | 3 | 1 | 1 |
| LOGO | LOGO | LOGO | ANY | ANY | 3 | 1 | 1 |
| LOGO | LOGO | ANY | ANY | ANY | 3 | 1 | 59 |
| Liberty Coin (LBTY) | | | | | 2 | 2 | 5 |
| LBTY | LBTY | LBTY | LBTY | LBTY | 5 | 3 | 6 |
| LBTY | LBTY | LBTY | LBTY | ANY | 5 | 3 | 6 |
| LBTY | LBTY | LBTY | ANY | ANY | 5 | 3 | 6 |
| LBTY | LBTY | ANY | ANY | ANY | 5 | 3 | 54 |
| Eagle (EAGLE) | | | | | 3 | 3 | 5 |
| EAGLE | EAGLE | EAGLE | EAGLE | EAGLE | 6 | 4 | 6 |
| EAGLE | EAGLE | EAGLE | EAGLE | ANY | 6 | 4 | 6 |
| EAGLE | EAGLE | EAGLE | ANY | ANY | 6 | 4 | 6 |
| EAGLE | EAGLE | ANY | ANY | ANY | 6 | 4 | 54 |
| Lotto Ball (LOTTO) | | | | | 5 | 2 | 8 |
| BALL | BALL | BALL | BALL | BALL | 8 | 3 | 9 |
| BALL | BALL | BALL | BALL | ANY | 8 | 3 | 9 |
| BALL | BALL | BALL | ANY | ANY | 8 | 3 | 9 |
| Stacks of Cash (CASH) | | | | | 6 | 8 | 5 |
| CASH | CASH | CASH | CASH | CASH | 9 | 9 | 6 |
| CASH | CASH | CASH | CASH | ANY | 9 | 9 | 6 |
| CASH | CASH | CASH | ANY | ANY | 9 | 9 | 6 |

FIG. 9A-1

Max Bet: 60

| Reel #4 | Reel #5 | | | | | | | |
|---|---|---|---|---|---|---|---|---|
| 89 1 | 89 1 | HITS | AVG. PAY | TOTAL | HITS 1 IN | WIN PROB. | Volatility | EV |
| 5 | 9 | | | | | | | |
| 5 | 9 | 540 | 20000 | 10800000 | 1.000E+06 | 1.0000E+06 | 3.99.95 | 2.00% |
| 5 | 41 | 2460 | 1000 | 2460000 | 2.195E+05 | 4.5556E+06 | 4.55 | 0.46% |
| 55 | 50 | 33000 | 100 | 3300000 | 1.636E+04 | 6.1111E+05 | 0.60 | 0.61% |
| 3 | 4 | | | | | | | |
| 3 | 4 | 36 | 20000 | 720000 | 1.500E+07 | 6.6667E-06 | 26.66 | |
| 3 | 46 | 414 | 100 | 414000 | 1.304E+08 | 7.6667E-07 | 0.77 | |
| 57 | 50 | 4938 | 100 | 493800 | 1.094E+05 | 9.1444E-06 | 0.09 | |
| 60 | 50 | 254118 | 0 | 2541180 | 2.125E+03 | 4.7059E-04 | 0.04 | |
| 11 | 4 | | | | | | | |
| 14 | 8 | 10008 | 500 | 5004000 | 5.396E+04 | 1.8533E-05 | 4.62 | |
| 14 | 42 | 52542 | 150 | 7981300 | 1.208E+04 | 9.7300E-05 | 2.16 | |
| 46 | 50 | 200100 | 40 | 8004000 | 2.699E+03 | 3.7056E-04 | 0.57 | |
| 60 | 50 | 1944000 | 5 | 9720000 | 2.778E+02 | 3.6000E-03 | 0.06 | |
| 10 | 4 | | | | | | | |
| 13 | 8 | 14804 | 400 | 5961600 | 3.623E+04 | 1.8533E-05 | 4.40 | |
| 13 | 42 | 78248 | 100 | 7824600 | 6.901E+03 | 9.7300E-05 | 1.42 | |
| 47 | 50 | 331350 | 30 | 9940500 | 1.630E+03 | 3.7056E-04 | 0.52 | |
| 60 | 50 | 3402000 | 5 | 17010000 | 1.587E+02 | 3.6000E-03 | 0.11 | |
| 10 | 10 | | | | | | | |
| 13 | 14 | 39312 | 0 | 0 | 1.374E+04 | 7.2800E-05 | 26.13 | |
| 13 | 36 | 99684 | 50 | 498200 | 5.417E+03 | 1.8460E-04 | 0.45 | |
| 47 | 50 | 500550 | 15 | 7508250 | 1.079E+03 | 9.2694E-04 | 0.18 | |
| 4 | 3 | | | | | | | |
| 7 | 7 | 23751 | 200 | 4750200 | 2.274E+04 | 4.3983E-05 | 1.74 | |
| 7 | 43 | 145383 | 50 | 7269150 | 3.714E+03 | 2.6923E-04 | 0.65 | |
| 53 | 50 | 1279950 | 15 | 19199250 | 4.219E+02 | 2.3703E-03 | 0.47 | |

FIG. 9A-2

| | | | | | | | |
|---|---|---|---|---|---|---|---|
| Armored Truck (TRUCK) | | | | | 6 | 10 | 6 |
| TRUCK | TRUCK | TRUCK | TRUCK | TRUCK | 9 | 11 | 7 |
| TRUCK | TRUCK | TRUCK | TRUCK | ANY | 9 | 11 | 7 |
| TRUCK | TRUCK | TRUCK | ANY | ANY | 9 | 11 | 7 |

| | | | | | | | |
|---|---|---|---|---|---|---|---|
| Black Pot (POT) | | | | | 10 | 13 | 9 |
| POT | POT | POT | POT | POT | 13 | 14 | 10 |
| POT | POT | POT | POT | ANY | 13 | 14 | 10 |
| POT | POT | POT | ANY | ANY | 13 | 14 | 10 |

| | | | | | | | |
|---|---|---|---|---|---|---|---|
| Bell (BELL) | | | | | 8 | 14 | 9 |
| BELL | BELL | BELL | BELL | BELL | 11 | 15 | 10 |
| BELL | BELL | BELL | BELL | ANY | 11 | 15 | 10 |
| BELL | BELL | BELL | ANY | ANY | 11 | 15 | 10 |

| | | | | | | | |
|---|---|---|---|---|---|---|---|
| Scratch Ticket (SCRATCH) [Scatter Bonus Trigger] | | | | | 2 | 2 | 1 |
| SCRATCH | SCRATCH | SCRATCH | SCRATCH | SCRATCH | 6 | 6 | 3 |
| | | | | | | | |
| SCRATCH | SCRATCH | SCRATCH | SCRATCH | ANY | 6 | 6 | 3 |
| SCRATCH | SCRATCH | SCRATCH | ANY | SCRATCH | 6 | 6 | 3 |
| SCRATCH | SCRATCH | ANY | SCRATCH | SCRATCH | 6 | 6 | 57 |
| SCRATCH | ANY | SCRATCH | SCRATCH | SCRATCH | 6 | 54 | 3 |
| ANY | SCRATCH | SCRATCH | SCRATCH | SCRATCH | 44 | 6 | 3 |
| | | | | | | | |
| SCRATCH | SCRATCH | SCRATCH | ANY | ANY | 6 | 6 | 3 |
| SCRATCH | SCRATCH | ANY | SCRATCH | ANY | 6 | 6 | 57 |
| SCRATCH | SCRATCH | ANY | ANY | SCRATCH | 6 | 6 | 57 |
| SCRATCH | ANY | SCRATCH | SCRATCH | ANY | 6 | 54 | 3 |
| SCRATCH | ANY | SCRATCH | ANY | SCRATCH | 6 | 54 | 3 |
| SCRATCH | ANY | ANY | SCRATCH | SCRATCH | 6 | 54 | 57 |
| ANY | SCRATCH | SCRATCH | SCRATCH | ANY | 44 | 6 | 3 |
| ANY | SCRATCH | SCRATCH | ANY | SCRATCH | 44 | 6 | 3 |
| ANY | SCRATCH | ANY | SCRATCH | SCRATCH | 44 | 6 | 57 |
| ANY | ANY | SCRATCH | SCRATCH | SCRATCH | 44 | 54 | 3 |

FIG. 9A-3

| | | | | | | | |
|---|---|---|---|---|---|---|---|
| 6 | 3 | | | | | | |
| 9 | 7 | 43596 | 150 | 6539400 | 1.239E+04 | 8.0733E-05 | 1.80 |
| 9 | 43 | 267030 | 30 | 8010900 | 2.022E+03 | 4.9450E-04 | 0.42 |
| 51 | 50 | 1759500 | 10 | 17595000 | 3.069E+02 | 3.2583E-03 | 0.27 |

| | | | | | | | |
|---|---|---|---|---|---|---|---|
| 5 | 4 | | | | | | |
| 8 | 6 | 116408 | 100 | 11640800 | 4.639E+03 | 2.1557E-04 | 2.12 |
| 8 | 42 | 610512 | 20 | 12210240 | 8.845E+02 | 1.1306E-03 | 0.41 |
| 52 | 50 | 4654000 | 5 | 23270000 | 1.160E+02 | 8.6185E-03 | 0.15 |

| | | | | | | | |
|---|---|---|---|---|---|---|---|
| 4 | 7 | | | | | | |
| 7 | 11 | 126951 | 100 | 12695100 | 4.254E+03 | 2.3508E-04 | 2.31 |
| 7 | 39 | 448631 | 20 | 8992620 | 1.201E+03 | 8.3265E-04 | 0.30 |
| 53 | 50 | 4293000 | 5 | 21465000 | 1.258E+02 | 7.9500E-03 | 0.13 |

| | | | | | | | |
|---|---|---|---|---|---|---|---|
| 2 | 2 | | | | | | |
| 6 | 6 | 3888 | 10 | 38880 | 1.389E+05 | 7.2000E-06 | 0.01 |
| | | | | | | | |
| 6 | 44 | 28512 | 5 | 142560 | 1.894E+04 | 5.2800E-05 | 0.03 |
| 54 | 6 | 34992 | 5 | 174960 | 1.543E+04 | 6.4800E-05 | 0.04 |
| 6 | 6 | 73872 | 5 | 369360 | 7.310E+03 | 1.3680E-04 | 0.08 |
| 6 | 6 | 34992 | 5 | 174960 | 1.543E+04 | 6.4800E-05 | 0.04 |
| 6 | 6 | 28512 | 5 | 142560 | 1.894E+02 | 5.2800E-05 | 0.03 |
| | | | | | | | |
| 54 | 44 | 256608 | 0 | 0 | 2.104E+03 | 4.7520E-04 | 0.18 |
| 6 | 44 | 541729 | 0 | 0 | 9.968E+02 | 1.0032E-03 | 0.38 |
| 54 | 6 | 664848 | 0 | 0 | 8.122E+02 | 1.2312E-03 | 0.47 |
| 6 | 44 | 256808 | 0 | 0 | 2.104E+03 | 4.7520E-04 | 0.18 |
| 54 | 6 | 314928 | 0 | 0 | 1.715E+03 | 5.8320E-04 | 0.22 |
| 6 | 6 | 664848 | 0 | 0 | 8.122E+02 | 1.2312E-03 | 0.47 |
| 6 | 44 | 209088 | 0 | 0 | 2.583E+03 | 3.8720E-04 | 0.15 |
| 54 | 6 | 256608 | 0 | 0 | 2.104E+03 | 4.7520E-04 | 0.18 |
| 6 | 6 | 541728 | 0 | 0 | 9.968E+02 | 1.0032E-03 | 0.38 |
| 6 | 6 | 256608 | 0 | 0 | 2.104E+03 | 4.7520E-04 | 0.18 |

FIG. 9A-4

| | | | | | | | | | | | | | | | | | |
|---|---|---|---|---|---|---|---|---|---|---|---|---|---|---|---|---|---|
| Matrix Progressive [MATRIX] | | | | | | | | | | | | | | | | | |
| (Matrix Progressive Bonus Trigger) | | | | | 3 | 4 | 5 | 0 | 0 | | | | | | | | |
| MATRIX | MATRIX | MATRIX | ANY | ANY | 3 | 4 | 5 | 60 | 50 | 180000 | 0 | 0 | 3.00E=03 | 3.3333E04 | 126.82 | 0.00% | |

| | | | | | | | | | | |
|---|---|---|---|---|---|---|---|---|---|---|
| TOTAL | 50 | 60 | 60 | 60 | 50 | 25086282 | 259243370 | 1.500E+07 | 4.6389E-02 | 208.80 | 48.01% |

Cycle 54000000
Hits 25086282
Scatter Hits 4168368
Non Scatter Hits 20917914

Hit Frequency 4.65%
1 Line Hits 1 in 21.5257088
25 Line hit Frequency
25 Line Hits 1 in 2.20

Base Game Percentage 48.01%
Scratch Ticket Bonus Percentage 15.77%
Power Feature Percentage 4.37%
Powerball Bonus Percentage 20.59%
Total Game Percentage 88.74%
Volatility (90%) 23.84
Volatility (99%) 37.28

| Bonus | Triggers | Hits 1 in | | Hit Freq | | Avg Pay | | EV |
|---|---|---|---|---|---|---|---|---|
| | | 1 Line | 15 Line | 1 Line | 15 Line | 1 Line | 15 Line | |
| Scratch | 5 | 138,889 | 138,889 | 0.00% | 0.00% | 20.43 | 306.43 | 0.01% |
| Scratch | 4 | 2,688 | 2,688 | 0.04% | 0.04% | 20.43 | 306.43 | 0.76% |
| Scratch | 3 | 136 | 136 | 0.73% | 0.73% | 20.43 | 306.43 | 14.99% |
| PwrFeature | 5 | 13,736 | 916 | 0.01% | 0.11% | 600.00 | 600.00 | 4.37% |
| PwrBall | 3 | 3,000 | 200 | 0.03% | 0.03% | 617.79 | 617.00 | 20.59% |

REEL STRIPS

| | 89_1 | 89_1 | 89_1 | 89_1 | 89_1 |
|---|---|---|---|---|---|
| JACKPOT | 2 | 1 | 6 | 5 | 9 |
| LOGO | 3 | 1 | 1 | 3 | 4 |
| LBTY | 2 | 2 | 5 | 11 | 4 |
| EAGLE | 3 | 3 | 5 | 10 | 4 |
| BALL | 5 | 2 | 8 | 10 | 10 |
| CASH | 6 | 8 | 5 | 4 | 3 |
| TRUCK | 6 | 10 | 6 | 6 | 3 |
| POT | 10 | 13 | 9 | 5 | 4 |
| BELL | 8 | 14 | 9 | 4 | 7 |
| SCRATCH | 2 | 2 | 1 | 2 | 2 |
| MATRIX | 3 | | | | |
| TOTAL | 50 | 60 | 60 | 60 | 50 |

5 JACKPOT on Payline 1
at Max Bettrigger the jackpot

| Pay | Added Jackpot EV | Max Bet Total% |
|---|---|---|
| 200,000 | 0.200% | 88.94% |

FIG. 9B-1

| |
|---|
| 9B-1 |
| 9B-2 |

| | Line Pays | Bonus |
|---|---|---|
| 5 | 13.23% | 0.00% |
| 10 | 3.73% | 0.00% |
| 15 | 4.95% | 0.00% |
| 20 | 3.93% | 0.00% |
| 30 | 3.32% | 0.00% |
| 40 | 1.48% | 0.00% |
| 50 | 2.27% | 0.00% |
| 75 | 0.19% | 0.00% |
| 100 | 6.66% | 0.00% |
| 150 | 2.68% | 0.00% |
| 200 | 0.88% | 0.00% |
| 306 | 0.00% | 15.77% |
| 400 | 1.10% | 0.00% |
| 500 | 0.93% | 0.00% |
| 600 | 0.00% | 4.37% |
| 1000 | 0.53% | 0.00% |
| 618 | 0.00% | 20.59% |
| 20000 | 2.13% | 0.00% |

Pay Distribution (15 Lines Bet at 1 Per Line)

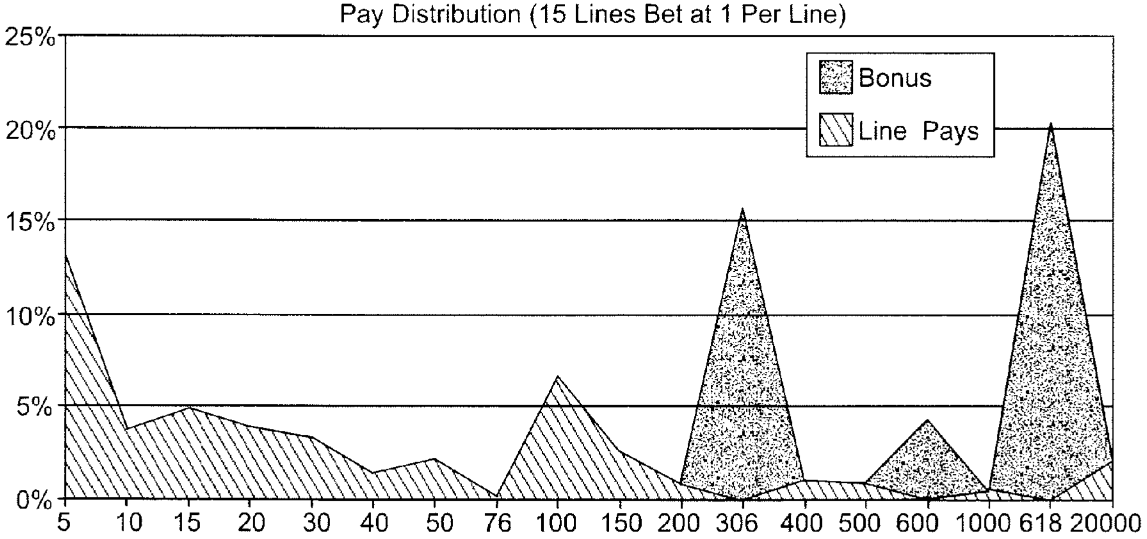

Game Summary

Volatiltity 23.84%

| Games | Min % | Max % |
|---|---|---|
| 1000 | 13.34% | 164.13% |
| 10,000 | 64.89% | 112.58% |
| 100,000 | 81.20% | 96.28% |
| 1,000,000 | 86.35% | 91.12% |
| 10,000,000 | 87.95% | 89.49% |
| 100,000,000 | 88.50% | 88.97% |

Reels 5
Lines 15

Cycle Size 540000000
Top Award Combination 5 JACKPOT on Payline
Top Award Odds 1 in 1 at Max Bet
1,000,000

| | 1 Line | 15 Line |
|---|---|---|
| Hit Frequency | 4.65% | 2.20 |
| Spins to hit Scratch Bonus | 130 | 130 |
| Spins to hit PwrFeature Bonus | 13,736 | 916 |
| Spins to hit PwrBall Bonus | 3,000 | 200 |

| Top Award - Primary | |
|---|---|
| Max Bet | Top Award |
| 60 | 200,000 |
| | |
| | |
| | |
| | |
| | |
| | |
| | |

| Hits Per Cycle | |
|---|---|
| All Line Combos | |
| Type | Hits |
| | |
| Scratch | 4,168,368 |
| PwrFeature | 39,312 |
| PwrBall | 180,000 |

Notes:
3 or more scattered SCRATCH symbols trigger the Scratch Bonus.
P-O-W-E-R symbols on an active payline trigger the Power Feature.
3 MATRIX symbols on an active payline trigger the Powerball Bonus.
LOGO is wild for all symbols except JACKPOT, SCRATCH, and MATRIX.

| 9B-1 |
|---|
| 9B-2 |

FIG. 9B-2

Progressive Summary

| Powerball Bonus Component | Bet Per Line Payback % 1 | | | |
|---|---|---|---|---|
| LAP Contribution | 3.50% | 1.75% | 1.17% | 0.88% |
| LAP Initial Reset | 16.39% | 8.19% | 5.46% | 4.10% |
| LAP Non-Initial Reset | 0.00% | 8.19% | 10.93% | 12.29% |
| Keep Going feature | 0.70% | 2.45% | 3.03% | 3.33% |
| Total | 20.59% | 20.59% | 20.59% | 20.59% |
| LAP only Total | 19.89% | 9.94% | 6.63% | 4.97% |

LAP= Local Area Progressive

Matrix Local Progressive / LAP Summary (15 Lines Bet at 1 Per Line)
Note: The LAP Contribution rate is applied to all credits bet on the 1st bet per line.
The rate is not applied to credits bet on the 2nd, 3rd, and 4th bet per line.

| LAP Reset Amount | RED | WHITE | BLUE |
|---|---|---|---|
| MEGA | $100.00 | $250.00 | $200.00 |
| SUPER | $10.00 | $20.00 | $15.00 |
| GRAND | $10.00 | $15.00 | $12.00 |

| LAP Contribution | RED | WHITE | BLUE |
|---|---|---|---|
| MEGA | 0.400% | 0.150% | 0.200% |
| SUPER | 0.500% | 0.250% | 0.500% |
| GRAND | 0.600% | 0.300% | 0.600% |
| | | Total Sum | 3.500% |

| LAP Reset Expected Value | RED | WHITE | BLUE |
|---|---|---|---|
| MEGA | 0.88% | 2.19% | 1.75% |
| SUPER | 1.37% | 1.43% | 1.58% |
| GRAND | 2.41% | 2.75% | 2.02% |
| | | Total Sum | 16.39% |

| LAP Spins to Hit | RED | WHITE | BLUE |
|---|---|---|---|
| MEGA | 15,201.93 | 15,201.93 | 15,201.93 |
| SUPER | 974.71 | 1,859.89 | 1,263.75 |
| GRAND | 552.58 | 728.21 | 791.18 |

| LAP Cost | RED | WHITE | BLUE |
|---|---|---|---|
| MEGA | $11,401.45 | $11,401.45 | $11,401.45 |
| SUPER | $731.03 | $1,394.92 | $947.81 |
| GRAND | $414.44 | $546.16 | $593.39 |

| LAP Meter Level Number | RED | WHITE | BLUE |
|---|---|---|---|
| MEGA | 2 | 1 | 3 |
| SUPER | 5 | 4 | 6 |
| GRAND | 8 | | |

FIG. 9C-1

| |
|---|
| 9C-1 |
| 9C-2 |

| | R1 89_1 | R2 89_1 | R3 89_1 | R4 89_1 | R5 89_1 |
|---|---|---|---|---|---|
| 0 | CASH | POT | POT | LBTY | JACKPOT |
| 1 | BELL | TRUCK | BALL | CASH | TRUCK |
| 2 | LOGO | BELL | LBTY | BALL | BALL |
| 3 | POT | EAGLE | BELL | LBTY | JACKPOT |
| 4 | CASH | POT | BALL | POT | BELL |
| 5 | LOGO | TRUCK | POT | SCRATCH | BALL |
| 6 | POT | BELL | CASH | LBTY | JACKPOT |
| 7 | TRUCK | CASH | LOGO | EAGLE | POT |
| 8 | CASH | BELL | POT | TRUCK | BELL |
| 9 | POT | EAGLE | BELL | SCRATCH | BALL |
| 10 | JACKPOT | CASH | TRUCK | POT | POT |
| 11 | EAGLE | POT | JACKPOT | CASH | LOGO |
| 12 | POT | MATRIX | CASH | LBTY | EAGLE |
| 13 | MATRIX | LBTY | POT | LOGO | SCRATCH |
| 14 | TRUCK | BELL | JACKPOT | POT | BALL |
| 15 | POT | EAGLE | EAGLE | BELL | LBTY |
| 16 | CASH | CASH | LBTY | EAGLE | EAGLE |
| 17 | LBTY | POT | BALL | LBTY | LOGO |
| 18 | POT | BELL | JACKPOT | LOGO | POT |
| 19 | SCRATCH | TRUCK | CASH | TRUCK | EAGLE |
| 20 | BELL | POT | BELL | EAGLE | LOGO |
| 21 | POT | MATRIX | BALL | CASH | TRUCK |
| 22 | TRUCK | CASH | EAGLE | LOGO | LBTY |
| 23 | LOGO | POT | BELL | LBTY | SCRATCH |
| 24 | BELL | BELL | LBTY | EAGLE | BALL |
| 25 | TRUCK | TRUCK | MATRIX | POT | BELL |
| 26 | SCRATCH | POT | BELL | BALL | JACKPOT |
| 27 | CASH | BELL | TRUCK | LBTY | BSLL |
| 28 | POT | TRUCK | MATRIX | EAGLE | BELL |
| 29 | MATRIX | MATRIX | EAGLE | BALL | JACKPOT |
| 30 | TRUCK | BELL | CASH | BELL | BALL |
| 31 | POT | POT | POT | LBTY | BELL |
| 32 | BALL | BALL | MATRIX | BALL | JACKPOT |
| 33 | BELL | BELL | EAGLE | POT | CASH |
| 34 | EAGLE | POT | BELL | JACKPOT | TRUCK |
| 35 | BALL | MATRIX | SCRATCH | BALL | JACKPOT |
| 36 | BALL | TRUCK | TRUCK | BELL | CASH |
| 37 | TRUCK | CASH | POT | TRUCK | BALL |
| 38 | BAL | BALL | JACKPOT | BALL | LBTY |
| 39 | LBTY | POT | BALL | JACKPOT | BALL |
| 40 | BELL | TRUCK | TRUCK | EAGLE | LOGO |
| 41 | BALL | LOGO | BELL | BALL | CASH |
| 42 | POT | BALL | JACKPOT | JACKPOT | LBTY |
| 43 | JACKPOT | TRUCK | LBTY | TRUCK | JACKPOT |
| 44 | BEL | POT | POT | LBTY | BALL |
| 45 | CASH | BELL | BALL | JACKPOT | BELL |
| 46 | MATRIX | CASH | JACKPOT | EAGLE | JACKPOT |
| 47 | BELL | JACKPOT | POT | CASH | EAGLE |
| 48 | EAGLE | TRUCK | BALL | BALL | POT |
| 49 | BALL | BELL | TRUCK | LBTY | BALL |
| 50 | X | SCRATCH | CASH | EAGLE | X |
| 51 | X | POT | BELL | JACKPOT | X |
| 52 | X | CASH | MATRIX | LBTY | X |
| 53 | X | BELL | EAGLE | EAGLE | X |
| 54 | X | SCRATCH | BELL | TRUCK | X |
| 55 | X | POT | MATRIX | BALL | X |
| 56 | X | BELL | TRUCK | BELL | X |
| 57 | X | CASH | POT | EAGLE | X |
| 58 | X | TRUCK | BALL | TRUCK | X |
| 59 | X | LBTY | LBTY | BALL | X |
| 60 | X | X | X | X | X |

FIG. 9C-2

| |
|---|
| 9C-1 |
| 9C-2 |

| WC | EV | Wager Category | 1st Bet | 2nd Bet | 3rd Bet | • • • | Total |
|---|---|---|---|---|---|---|---|
| ① | 88% | BG | 0 | 9 | 10 | | 19 |
| ② | 90% | BG + ZC_A | 15 | 0 | 0 | | 15 |
| ③ | 92% | PF_A - WC1 | 0 | 1 | 0 | | 1 |
| ④ | 90% | PF_A -WC2 | 2 | 0 | 2 | | 4 |
| ⑤ | 91% | FB_B | 1 | 1 | 0 | | 2 |

| BG | ZC_A | PF_A | PF_B |
|---|---|---|---|
| 88% | Max bet required | 1 credit → 90% | 1 credit → 94% |
| 1-15 credits | 91% | 2 credits → 95% | |

FIG.11

GAMING SYSTEM HAVING TOOLS FOR CATEGORIZING WAGERS AND METERING PERFORMANCE OF WAGERING GAMES AND SUPPLEMENTAL FEATURES

CROSS-REFERENCE TO RELATED APPLICATIONS

This application is a U.S. National Stage of International Application No. PCT/US2008/012590, filed Nov. 7, 2008, entitled "Gaming System Having Tools for Categorizing Wagers and Metering Performance of Wagering Games and Supplemental Features," which claims the benefit of U.S. Provisional Application No. 61/002,751, filed on Nov. 9, 2007, both of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having tools for categorizing wagers and metering performance of wagering games and supplemental features.

SUMMARY OF THE INVENTION

According to one aspect of the present invention, a method of operating a wagering game comprises receiving one or more configuration inputs to create at least one wagering game configuration. The at least one wagering game configuration comprises at least one base game and at least one portal game. The at least one base game is operable in response to receipt of a primary wager, the primary wager being within a range of allowable wagers. The range includes minimum and maximum allowable wagers. The at least one portal game having a set of eligibility criteria. The method further comprises creating a plurality of wager categories based upon the set of eligibility criteria and a size of the primary wager, activating participation in the at least one portal game if the set of eligibility criteria is satisfied, and metering the entire primary wager to a single wager category.

According to another aspect of the invention, a gaming system comprises a plurality of gaming devices in communication with an control computer, the control computer in communication with at least one memory storage device and at least one wagering game configuration stored on the at least one memory storage device, the at least one wagering game configuration comprising a base game and at least one portal game. At least one controller is operative to (i) receive a plurality of wager categories associated with the at least one wagering game configuration, (ii) receive a size of a primary wager amount collected from at least one player, (iii) assign the primary wager amount to a first one of the plurality of wager categories in accordance with a set of eligibility criteria, and (v) add the size of the primary wager amount to a credit in meter associated with the first wager category.

According to yet another aspect of the invention, a computer readable storage medium encoded with instructions for operating an expected value calculator, the expected value calculator performing the steps of (i) receiving a wagering game configuration comprising at least one base game and at least one portal game, (ii) in response to receiving the wagering game configuration, generating a plurality of wager categories associated with the wagering game configuration, (iii) receiving an input of a primary wager amount associated with play of the at least one base game, (iv) assigning the primary wager amount to one of the plurality of wager categories, and (v) calculating a theoretical overall payback percentage based upon a size of the primary wager.

According to yet another aspect of the invention, a computer readable storage medium is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIGS. 9*a*, 9*b*, 9*c* is an example of a PAR sheet which can be dynamically generated by a software tool of the present invention;

FIG. 11 is an example of metering various wagers to assigned wager categories and an accounting table for calculating theoretical expected values to be compared with actual expected values.

DETAILED DESCRIPTION

Figure 1A:
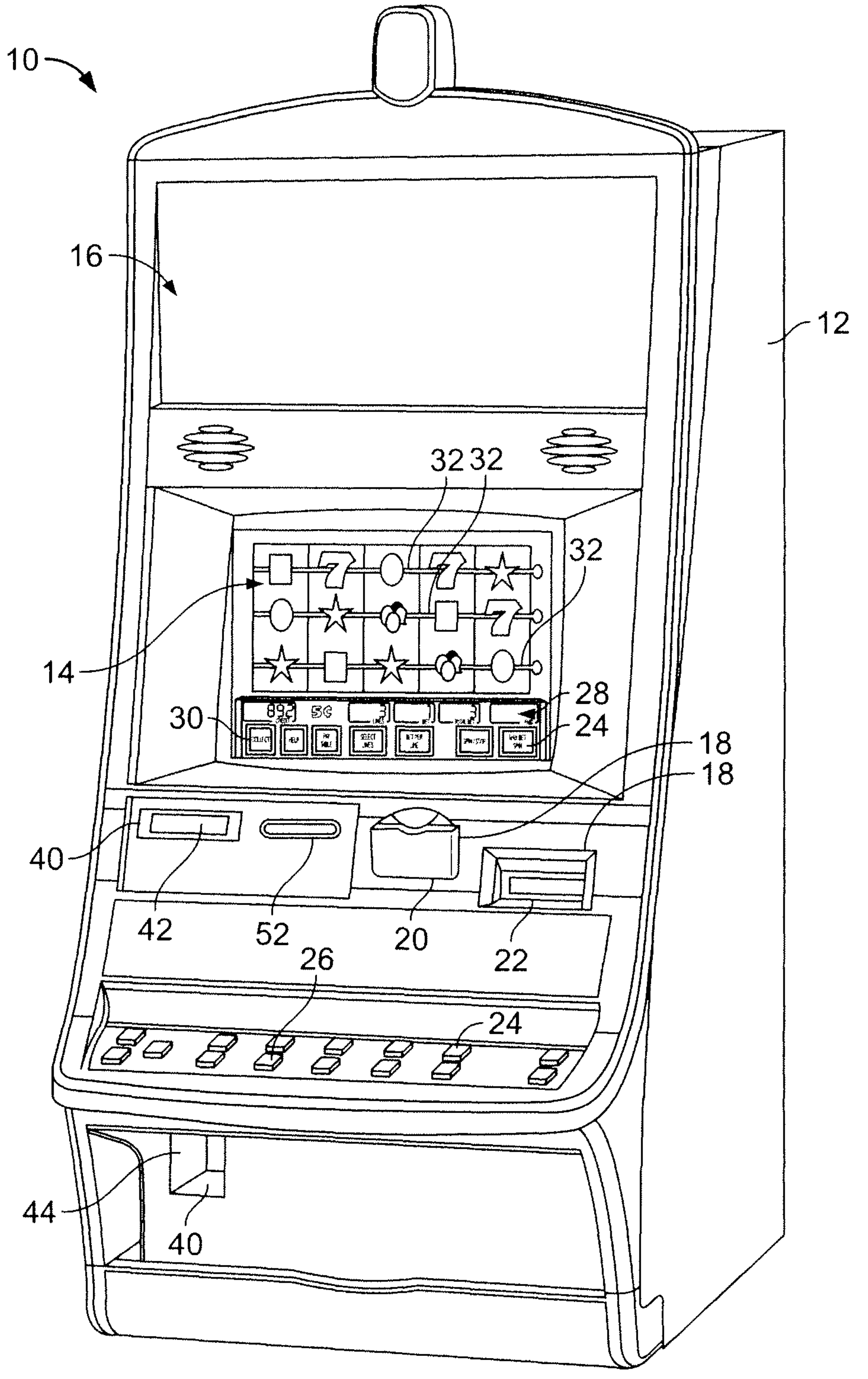
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
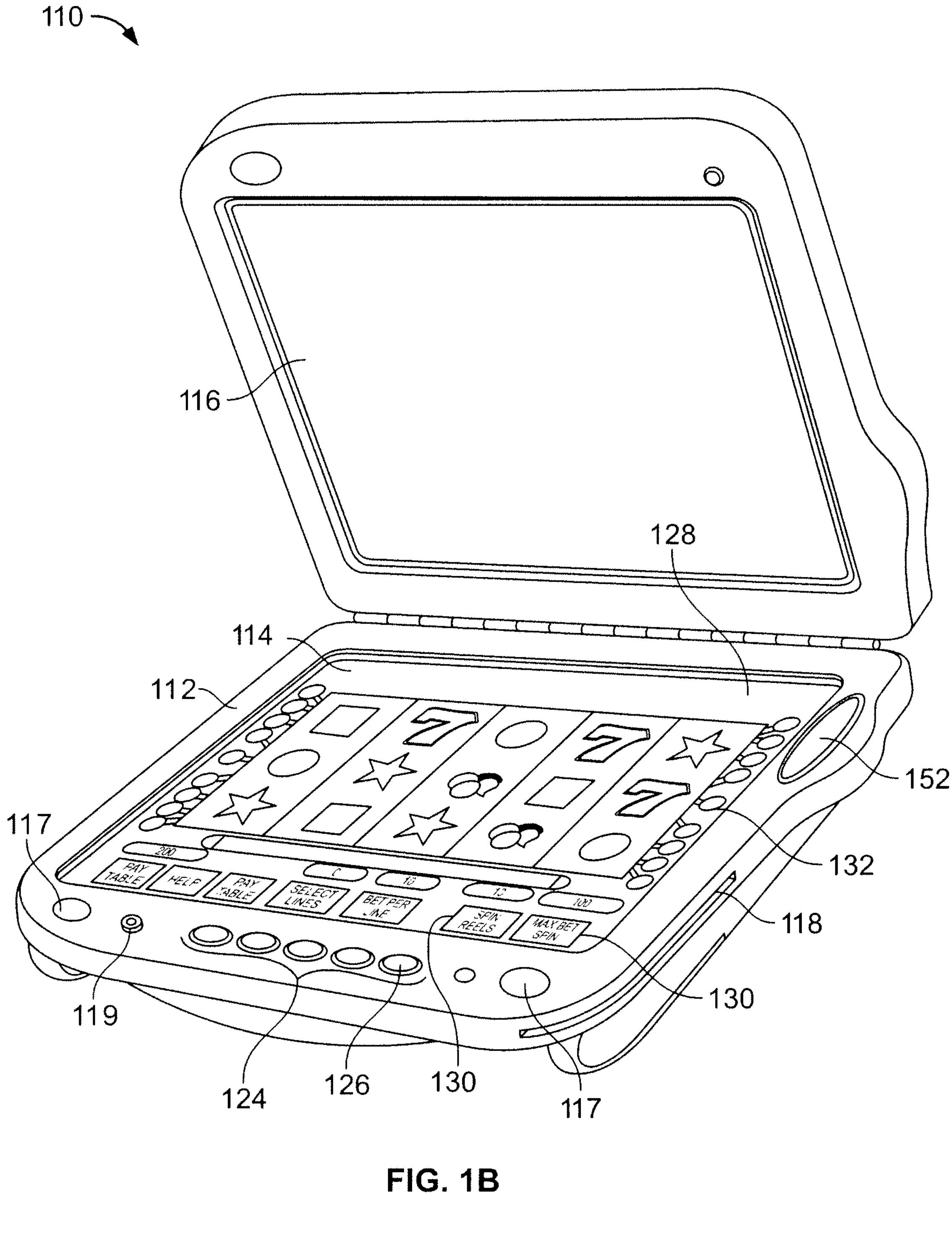
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
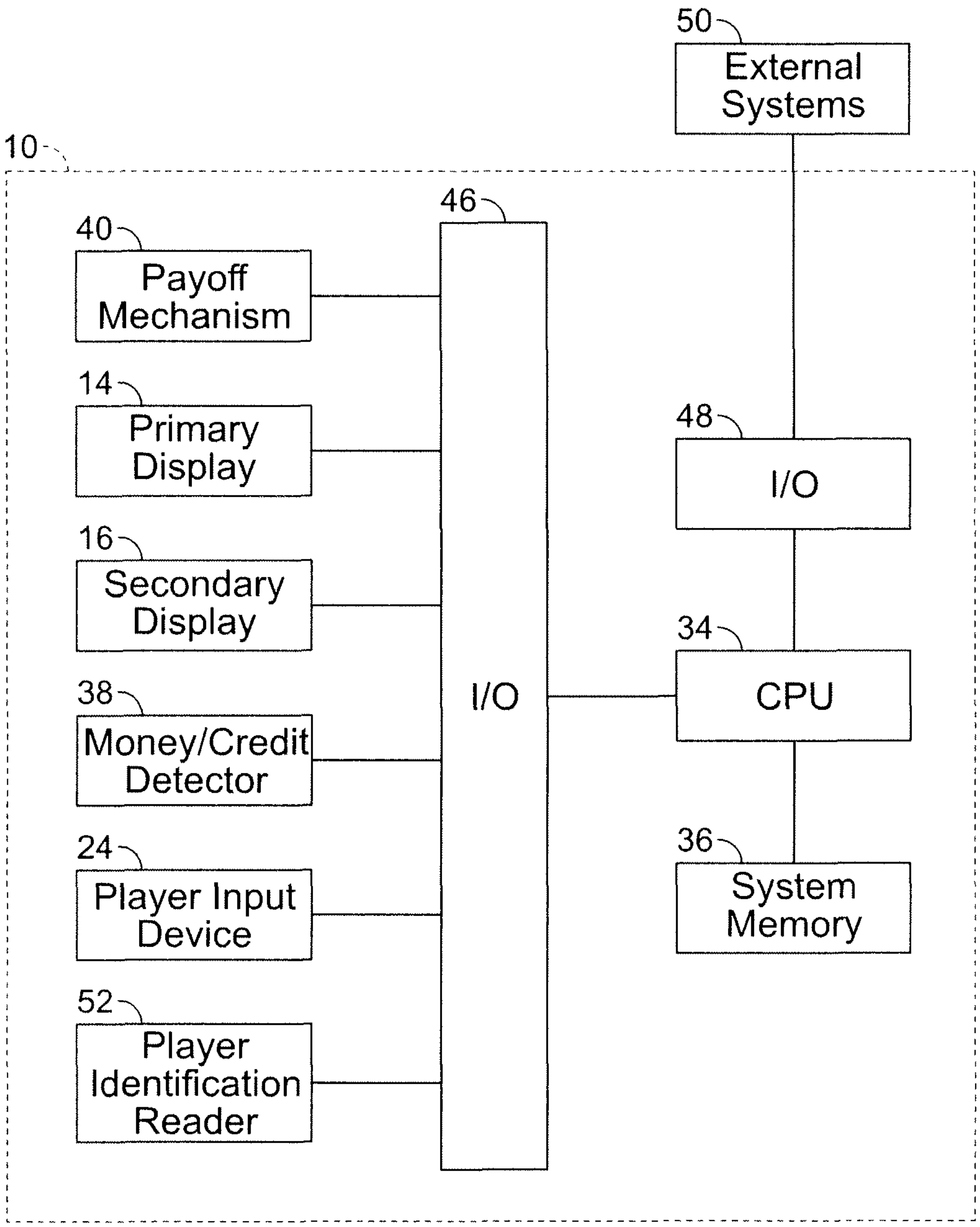
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
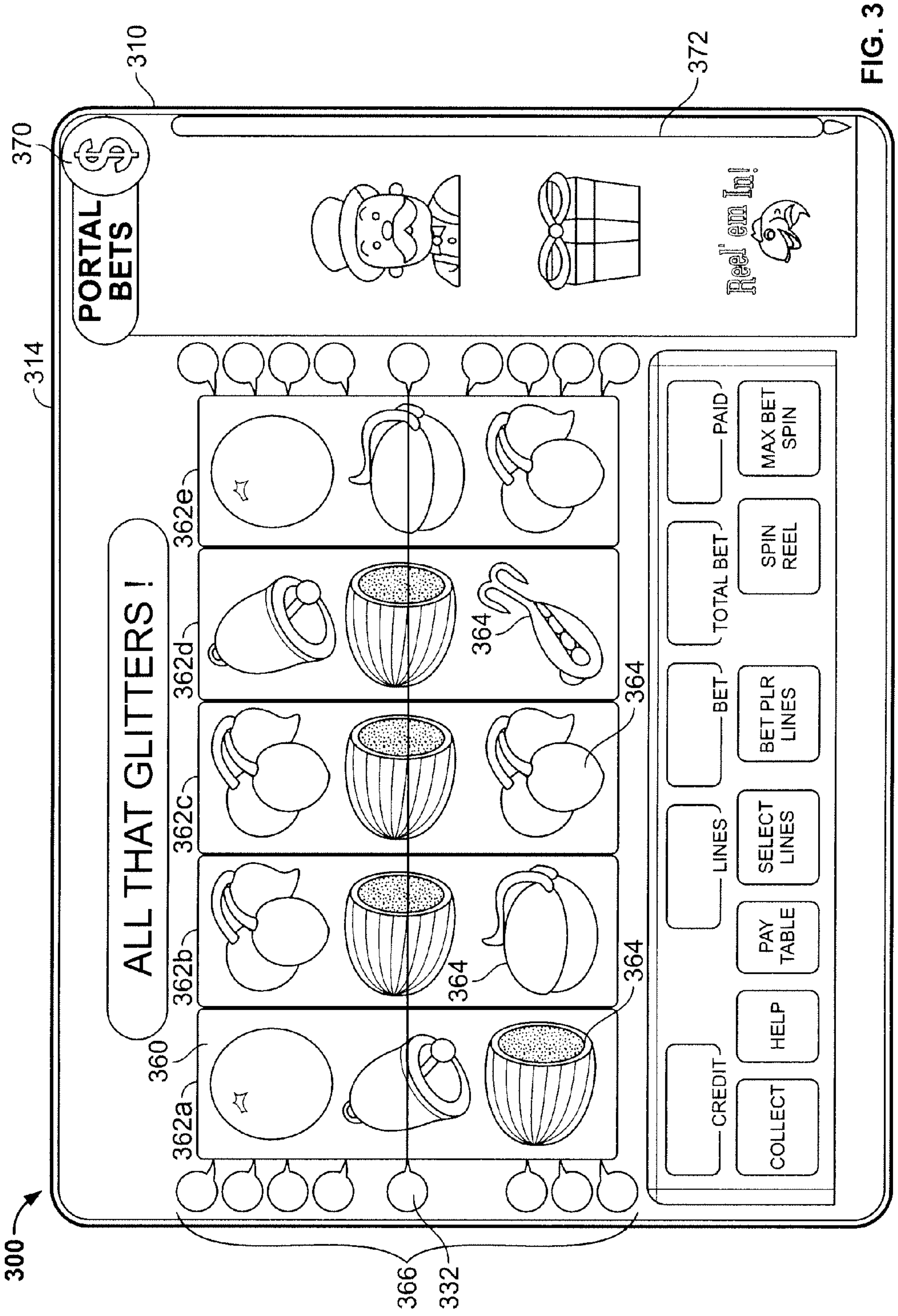
FIG. 3 is a screen shot of a primary display of a gaming system displaying a primary wagering game and a supplemental feature menu.

Turning now to FIG. 3, a primary display 314 of a first gaming device 310 of a gaming system 300 is shown. The primary display 314 may be any form of display such as those described herein with reference to the free standing and handheld gaming devices of FIGS. 1*a* and 1*b*. The primary display 314 includes a display of a primary wagering game 360, which in this embodiment is a slot game entitled "All That Glitters" as shown in FIG. 3. The slot game 360 includes a plurality of reels 362*a,b,c,d,e* which may be either electromechanical reels or simulations thereof on the primary display 314. The reels 362*a,b,c,d,e* include a plurality of symbols 364 displayed thereon that vary as the reels 362*a,b,c,d,e* are spun and stopped. The symbols 364 may include any variety of graphical symbols, elements, or representations, including symbols 364 which are associated with one or more themes of the gaming machine or system. The symbols 364 may also include a blank symbol or empty space. As described herein the symbols 364 landing on the active paylines 332 (the paylines for which a wager has been received) are evaluated for winning combinations. If a winning combination of symbols 364 lands on an active payline 332 a primary award is awarded in accordance with a pay table of the gaming device. The symbols 364 on the reels 362*a,b,c,d,e* form an array 366 or matrix of symbols 364, having a number of rows and columns, which in the embodiment shown is three rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

The system 300 further includes a feature icon 370 for displaying and receiving selection and activation of various supplemental features to the wagering game 360. The feature icon 370 in FIG. 3 comprises a graphical icon or button entitled "Portal Bets." In other embodiments, other icons or graphics may be utilized, and may include isolated buttons, icons, or even a graphical bar or menu, for example across the top, bottom, or side of the display 314. The feature icon 370 can be selected or activated by a player of the wagering game 360 through a touch screen (not shown) overlying the display 314, or through any other appropriate player input device as described herein with relation to FIGS. 1*a*, 1*b*, and 2.

As seen in FIG. 3, once the feature icon 370 has been selected or activated, a feature menu 372 is displayed on the primary display 314 of the system 300. The feature menu 372 includes and displays a plurality of available features which are provided for activation or selection in addition to the primary wagering game 360. In FIG. 3, three features have been activated by an operator of the gaming system 300, and thus the feature menu 372 displays the three features 374*a,b,c* graphically, which include a Monopoly feature 374*a*, a Jackpot Party feature 374*b*, and a Reel 'Em In feature 374*c*.

Any number of wagering-game features 374 may be made available to be activated by a player of the gaming system 300. The features 374 may include any number of improvements, additions, enhancements, or modifications of a standard basic wagering game experience displayed on the primary display 314. For example, the features 374 may include eligibility or participation in bonus games, progressive jackpots or awards, or community games or events, including group games, team competitions, and competitive or collaborative play. The features 374 may also include wagering game assets such as free spins, wild symbols, multipliers, symbol upgrades, expanding wild symbols, scatter symbols, etc. The features 374 may also include eligibility or participation in secondary wagering games, side-bet games, reel re-spins, or extra chances or opportunities during play of the primary wagering games.

In other embodiments, the features 374 that may be activated may include features usable in a selection game, such as additional selections, opportunities to replace or re-do a prior selection, opportunities to undo a poor selection or selection of a terminating symbol, etc. Moreover, the features 374 may include eligibility or participation in enhanced awards, improvements of randomly selected outcomes of a primary wagering game, advancement to higher levels of play, advancement to newer or more favorable episodes of wagering games, etc. In yet other embodiments, features 374 may include eligibility and participation in additional wagering games, other games within a casino or gaming establishment (e.g., other table games or electronic games), wide area progressive jackpots, local area progressive jackpots, tangible prize awards, player reward points and loyalty programs, etc. The features 374 of the gaming system 300 as described herein may comprise any feature available on a wagering game which may be funded by an increased wager, a side wager, a secondary or separate wager, via player reward points, or in any other manner utilizing any form of currency, monetary input or other value.

It should also be understood that the features 374 activated in the system 300 of the present invention may be any number of available wagering game features as described herein. Moreover, the features may include any enhancements or additions to the primary wagering game as described in detail in U.S. Patent Application Ser. No. 60/844,032 filed on Sep. 12, 2006, and US. Patent Application Ser. No. 60/802,984 filed on May 24, 2006, both of which are assigned to WMS Gaming Inc. Both such applications are hereby incorporated by reference, in their entirety, as if full set forth herein.

Figure 4:
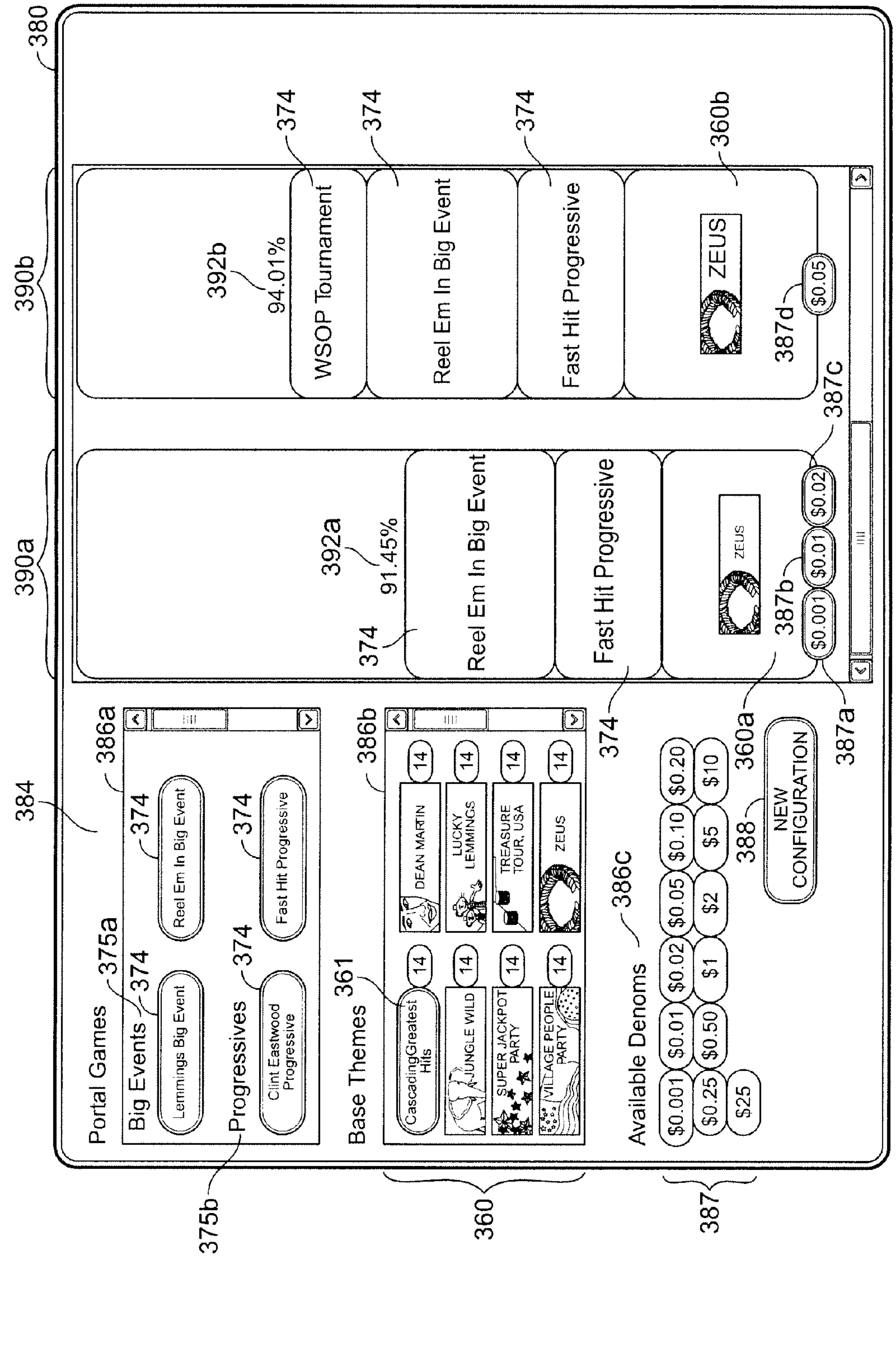
FIG. 4 is a screen shot of a control terminal for configuring supplemental features for use with one or more primary wagering games.

Turning to FIG. 4, an operator control interface 380 of the gaming system 300 is depicted. The operator control interface 380 includes a plurality of configuration screens for configuring the primary wagering game 360 displayed on the first gaming device 310, and for configuring other wagering games displayed on other gaming devices throughout the operator's establishment, for example, a casino. In an embodiment, the operator control interface 380 is in communication with, and forms part of, an operator control terminal through which one or more gaming functions of the operator's establishment are controlled. The operator control terminal may be in communication with one or more servers, utilizing wired and/or wireless network communications. The network may in turn be connected to other servers, gaming devices, computers, and control systems. The operator control terminal includes one or more input devices, such as a touch screen overlying the operator control interface 380, a mouse, and a keyboard, for receiving inputs from the operator to control the wagering games within the operator's establishment.

In alternative embodiments, the operator control interface 380 may be located elsewhere as part of the gaming system 300. For example, the operator control interface 380 may be viewable and usable on one or more gaming devices 310 in the system. For example, through a menu system, an operator may be able to recall the operator control interface 380 so as to appear on the primary display 314 of a gaming device 310, such as those shown and described with reference to FIGS. 1*a* and 1*b*. Moreover, the operator control interface 380 may appear on a handheld device, such as a handheld gaming device, or a handheld configuration computer which is in communication with the other components of the system 300 through wireless communications over a network. Thus, the operator control interface 380 may be provided in one or more locations throughout the system 300, including one or more gaming devices (freestanding or handheld), one or more operator control computers (freestanding or handheld), or through any other appropriate hardware having a display thereon, and at least one input device.

In FIG. 4, a control screen 384 is displayed on the operator control interface 380. The control screen 384 includes a plurality of categories 386 corresponding to attributes of the wagering games in the operator's facility which the operator can customize or control. For example, the categories 386 include Portal Games 386*a* which is a window in which are listed various supplemental features 374 available on the system 300 to the operator. Another category 386 is Base Themes 386*a* which lists primary wagering games 360 available on the system, by name of the themes of such games. Yet another category 386 is an Available Denoms 386*c* category which shows the available denominations 387 for primary wagers which can be configured by an operator. A new configuration button 388 is displayed below the categories which can be used to activate and control a new configuration setup of wagering games.

The Portal Games category 386*a* includes display of a plurality of supplemental features 374 which are organized and displayed in groups 375. In one embodiment, as shown in FIG. 4, the groups 375 comprise different types of features 374. For example, in a first group 375*a* are displayed features 374 which are "Big Event" community style features 374. In a second group 375*b* are displayed features 374 which are "Progressive" type features, such as progressive jackpots. Other groups 375 may be included in the Portal Games category 386*a*, but not visible until the category 386*a* is scrolled down using the menu bar slider on the right side of the Portal Games category 386*a* window.

In the Base Themes category 386*b* window are displayed a plurality of primary wagering games 360 available on the system for play and configuration. The primary wagering games 360 may be displayed graphically or using text, or both. Moreover, the primary wagering games 360 may be individually displayed by theme or title (such as "Jungle Wild," "Super Jackpot Party," or "Zeus"), or may also be displayed in sets 361 (such as "Cascading Greatest Hits"). Thus, a theme set 361 may be used and labeled to group a plurality of primary wagering games 360 together which have a common element, feature, or association. In the example shown, the games in the theme set 361 all have game play in which the symbols "cascade" or fall into the array rather than reels which spin and stop to display symbols. Other primary wagering games 360 and sets 361 may be displayed in the Base Themes category 386*b*, but not visible until the category 386*b* is scrolled down using the menu bar slider on the right side of the Base Themes category 386*b* window.

On a right side of the control screen 384 are one or more configurations 390*a,b* which are displayed as active once configured and activated by the operator. Each configuration includes a Base Theme, or primary wagering game 360*a,b* as well as, optionally, one or more Portal Games, or supplemental features 374. Moreover, each configuration 390*a,b* is specific to one or more denominations 387 as displayed along the bottom of the configuration 390*a,b*. Thus, the first configuration 390*a* applies only to the associated denominations 387*a, b,c* of $0.001, $0.01 and $0.02, respectively, while the second configuration 390*b* applied only to its associated denomination 387*d* of $0.05. An overall payback percentage 392*a,b* for each configuration 390*a,b* is associated with and displayed for each configuration 390*a,b* created by the operator.

The control screen 384 and operator control interface 380 employ drag and drop technology via one or more input devices such that the operator control interface 380 provides a graphical user input for receiving operator configurations of wagering games. Thus, in the embodiment shown, an operator creates a new configuration 390 by pressing the new configuration button 388. Once created, the operator first selects a Base Theme, or primary wagering game 360, from the Base Themes category 386*b* by selecting the theme and dragging and dropping it onto the newly created configuration 390 bar. Once dropped on the new configuration 390, the Base Theme 360 appears near the bottom of the new configuration 390. The operator then selects one or more Portal Games, or supplement features 374, and drags and drops them in succession onto the new configuration 390. They are visually stacked on top of the Base Theme 374 in the order that they are selected.

The operator also selects the denominations 387 for which he desires the new configuration 390 to be active by dragging and dropping denominations 387 from the Available Denom category 386*c* to the new configuration 390. The activated denominations 387 are thus displayed along the bottom of the new configuration 390 underneath the Base Theme 360. The dragging and dropping may be accomplished using a touch screen overlying the operator control interface 380 and control screen 384, or via an external input device such as a mouse, trackball, pointer, or other device. The operator can continue creating additional new configurations in the same manner which are displayed next to one another, and are also capable of being navigated using the menu slider bar along the bottom of the control screen 384

It should be understood that the listing of primary wagering games 360 in the Base Themes category 386*b* includes a listing of icons, identifiers, or labels associated with the relevant primary wagering games 360. Thus, the primary wagering games 360 in the Base Themes category 386*b* need not be the games 360 themselves, but instead may be textual listings, graphical icons, or other representations of the games 360. When the drag and drop technology is employed on the control screen 384, an operator may drag and drop an icon or other representation of the primary wagering game 360 in the Base Themes category 386*b* to the new configuration 390. Thus, as used herein, dragging and dropping "a Base Theme or primary wagering game 360," for example, refers to dragging an icon, identifier, or other representation of the primary wagering game 360 from one area of the control screen 384, and placing it or "dropping it" on another area of the control screen 384.

Similarly, the supplemental features 374 listed in the Portal Games category 386*a* may be represented by icons, identifiers, labels, or other representations. Thus, as used herein, dragging and dropping "a Portal Game or supplemental feature 374", for example, refers to dragging an icon, identifier, or other representation of the supplemental feature 374 from one area of the control screen 384, and placing it or "dropping it" on another area of the control screen 384. Similarly, the denominations 387 displayed in the Available Denoms category 386*c* may be icons, identifiers, labels or other representations of available denominations 387. As used herein, dragging and dropping "an Available Denom or denomination 387," for example, refers to dragging an icon, identifier, or other representation of the denomination 387 from one area of the control screen 384, and placing it or "dropping it" on another area of the control screen 384. In alternative embodiments, other elements on the control screen 384 which are capable of "drag and drop" manipulation may also be visually represented on the control screen 384 by an icon, label, identifier or other representation.

Figure 5:
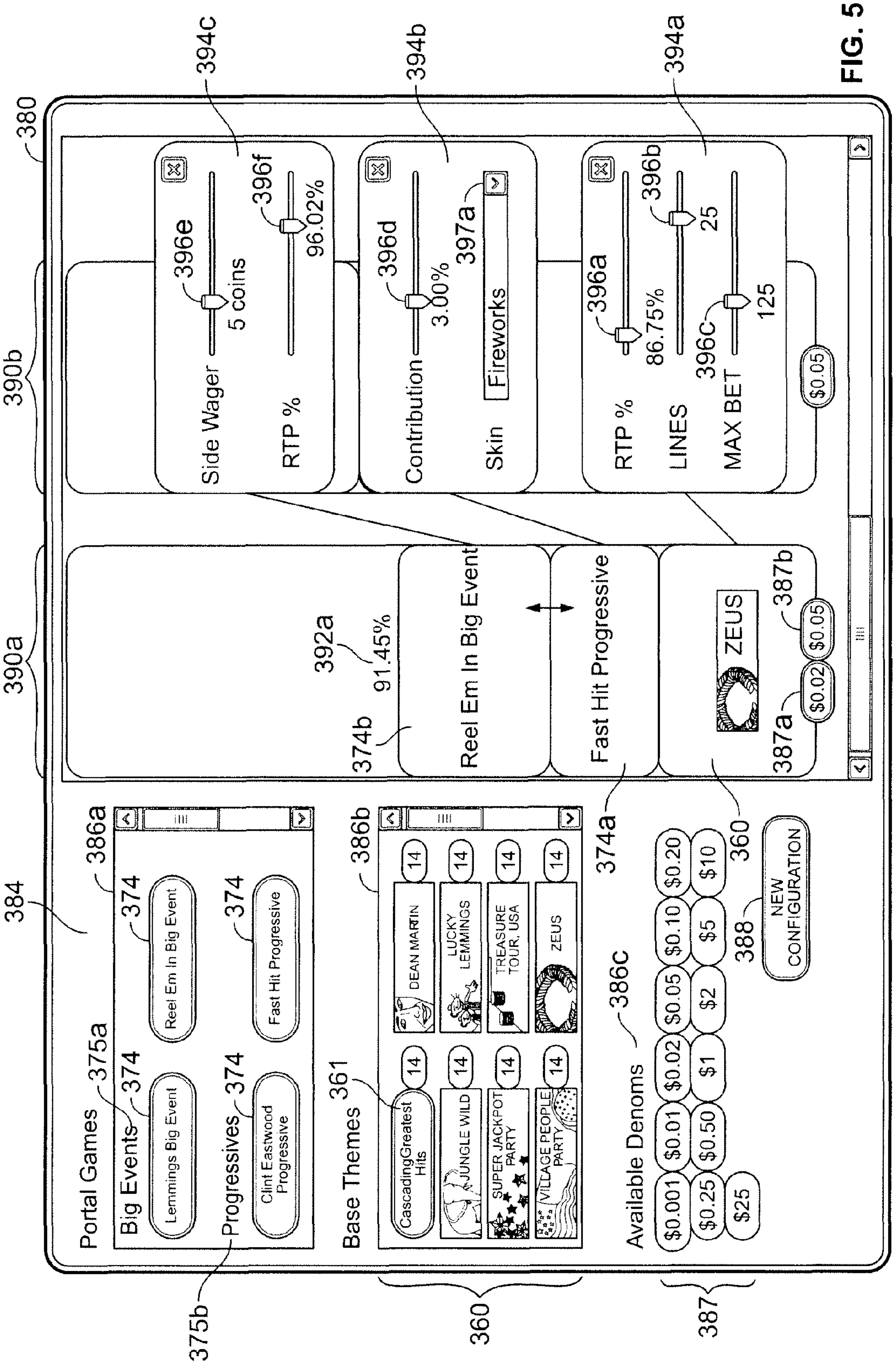
FIG. 5 is a screen shot of the control terminal of FIG. 4, showing an operator activating and configuring supplemental features.

Turning to FIG. 5, the control screen 384 and operator control interface 380 are shown wherein an operator is configuring individual elements of the available configurations 390*a,b*. Thus, for the first configuration 390*a*, a plurality of configuration pop-up windows 394*a,b,c* are shown corresponding to the various elements of the configuration 390*a*. For example, a first configuration pop-up window 394*a* corresponds to configuration of the Base Theme 360*a*, which in this embodiment is a "Zeus" primary wagering game 360*a*. The pop-up window 390*a* includes slider bars 396*a,b,c* for configuring various aspects of the Base Theme 360*a*. A first slider bar 396*a* is used for configuration of a primary payback percentage (RTP %) of the Base Theme 360*a*. A second slider bar 396*b* is used to configure a number of paylines available to be played on the selected Base Theme 360*a*. Finally, a third slider bar 396*c* is used to configure a maximum wager (Max Bet) for the Base Theme 360*a*. Each of the slider bars 396*a, b,c* is manipulated using the input device (e.g. touch screen) to slide the slider bar 396*a,b,c* left and right until the desired number for the configuration element is reached.

Similarly, the second configuration pop-up window 394*b* is used to configure aspects of the first Portal Game, or supplement feature 374*a*, on the configuration 390*a*, which in this case is a "Fast Hit Progressive" feature 374*a*. The pop-up window 394*b* includes another slider bar 396*d* for configuring a feature payback percentage or a "contribution" percentage. The pop-up window 394*b* further includes a pull down menu 397*a* for configuring an appearance or "skin" of the feature 374*a*. As seen in FIG. 5, the selected skin is "fireworks" which signifies that the feature 374*a* will include a fireworks themed overlay or appearance.

The third configuration pop-up window 394*c* corresponds to a second Portal Game, or supplemental feature 374*b* of the configuration 390*a*, which in this embodiment is a "Reel Em In Big Event" feature 374*b*. The pop-up window 394*c* includes yet more slider bars 396*e,f* for configuring various aspects of the associated Portal Game 374*b*. In this case, one slider bar 396*e* is used for configuring a side wager amount for the feature 374*b*. Another slider bar 396*f* is used for configuring a feature payback percentage (RTP %) for the selected feature 374*b*.

The various configurations performed in the configuration pop-up windows 394*a,b,c* affect the overall configuration 390*a* displayed. Thus, for example, the overall payback percentage 392*a* for the configuration 390*a* may be affected by various changes in the configurations of the configuration pop-up windows 394*a,b,c*. In one example, the overall payback percentage 392*a* is a function of, among other things, the size of the side wager and the feature payback percentage of the second Portal Game 374*b*, as displayed in the third configuration pop-up window 394*c*. Adjusting the feature payback percentage via the relevant slider 396*f* affects the overall payback percentage 392*a* displayed for the configuration 390*a*. Thus, the configuration 390*a* is dynamic and is displayed in real time or near real time, such that as one or more aspects of the configuration pop-up windows 394*a,b,c* are adjusted, the overall payback percentage 392*a* is dynamically updated. In this way, an operator is able to see the effects of particular adjustments in the pop-up windows 396*a,b,c* on the overall configuration 390*a*. Moreover, the size of the graphical windows of the elements of the configuration 390*a* may be adjusted to show relative changes in the payback percentages. Thus, changing the payback percentage of the selected Base Theme 360*a*, or selected features 374*a,b* causes the window around them to increase or decrease in size, and further causes the overall height of the stacked elements to increase or decrease as the overall payback percentage 392*a* increases or decreases as well. This gives the operator a visual impression of the configuration 390*a* as the height of the configuration 390*a*, as well as the size of the elements 360*a*,374*a,b* therein, change in response to adjustments of the slider bars 396.

Figure 6:
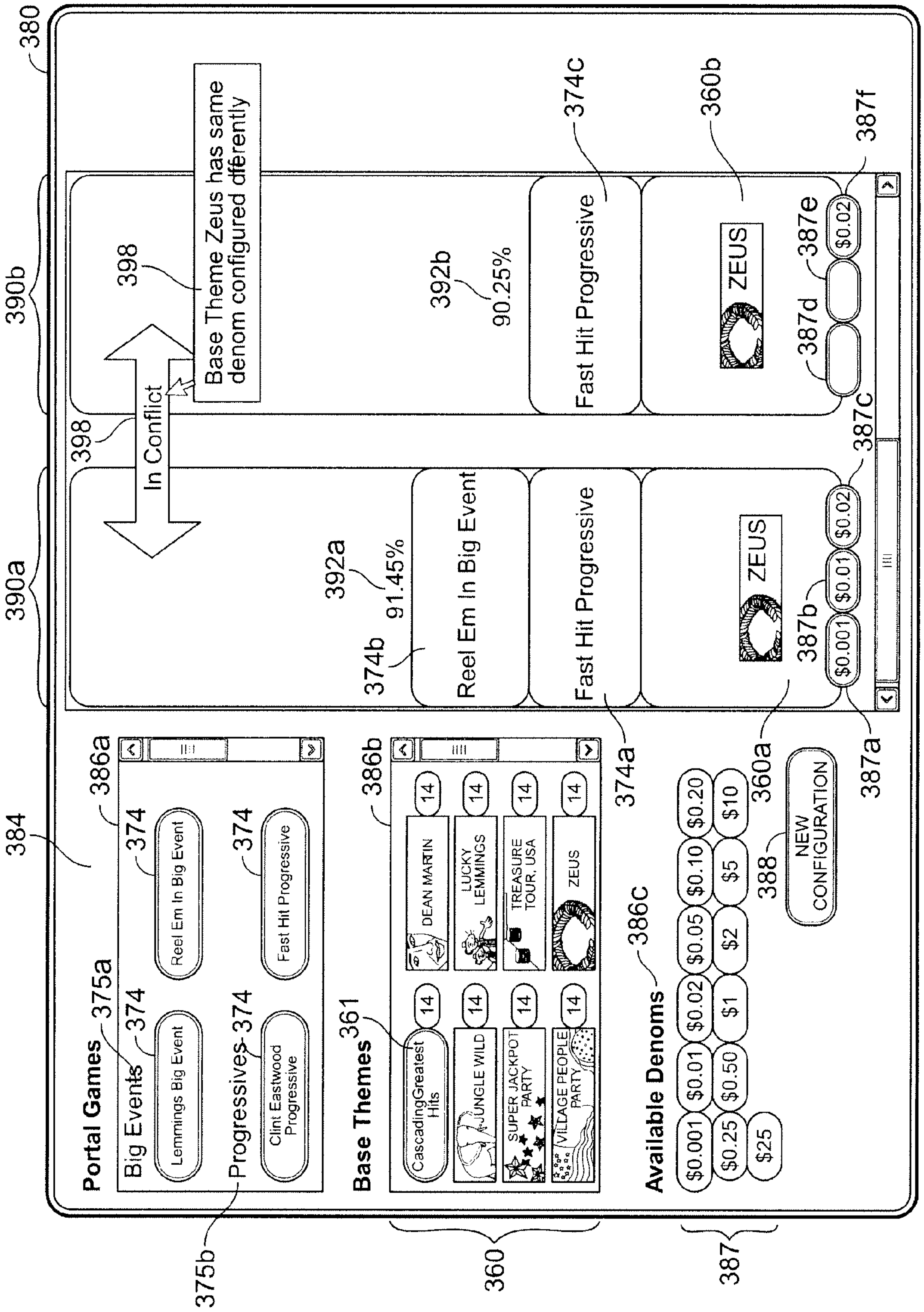
FIG. 6 is a further screen shot of the control terminal of FIG. 4, showing a conflict in wagering game configurations.

Turning to FIG. 6, another view of the operator control interface 380 is shown in which two configurations 390*a,b* have been created and activated by the operator. In the embodiment shown, the operator has selected the $0.001, $0.01 and $0.02 denominations 387*a,b,c* for the first configuration 390*a*, which includes the Base Theme 360*a* "Zeus." The operator has mistakenly selected the same $0.001, $0.01 and $0.02 denominations 387*d,e,f* for the second configuration 390*b*, which also has the Base Theme 360*b* "Zeus." This creates a conflict in the configuration because the same Base Theme 360*a,b* cannot be configured differently (two configurations 390*a,b*) for the same denomination 387. Thus, a conflict notification 398 is displayed on the control screen 384 of the operator control interface 380. In this embodiment, the conflict notification informs the operator of the conflict between the two configurations 390*a,b* (the words "In Conflict" and the arrows indicating the affected configurations 390*a,b*), as well as indicates to the operator the nature of the conflict ("Base Theme Zeus has same denom configured differently"). Thus, the conflict notification 398 is used to indicate to the operator that two or more of the active configurations 390*a,b* are in conflict and include configurations which are not permissible under one or more rule sets governing the operator control interface 380. The conflict notification 398 may include other elements to help highlight and signify the conflict. For example, background colors, shading, etc. on the various components of the configurations 390*a,b* may be changed to emphasize the conflict. In one embodiment, for any two configurations 390*a,b* in conflict, the background color of the configuration 390*a,b* bars is changed to red.

Figure 7:
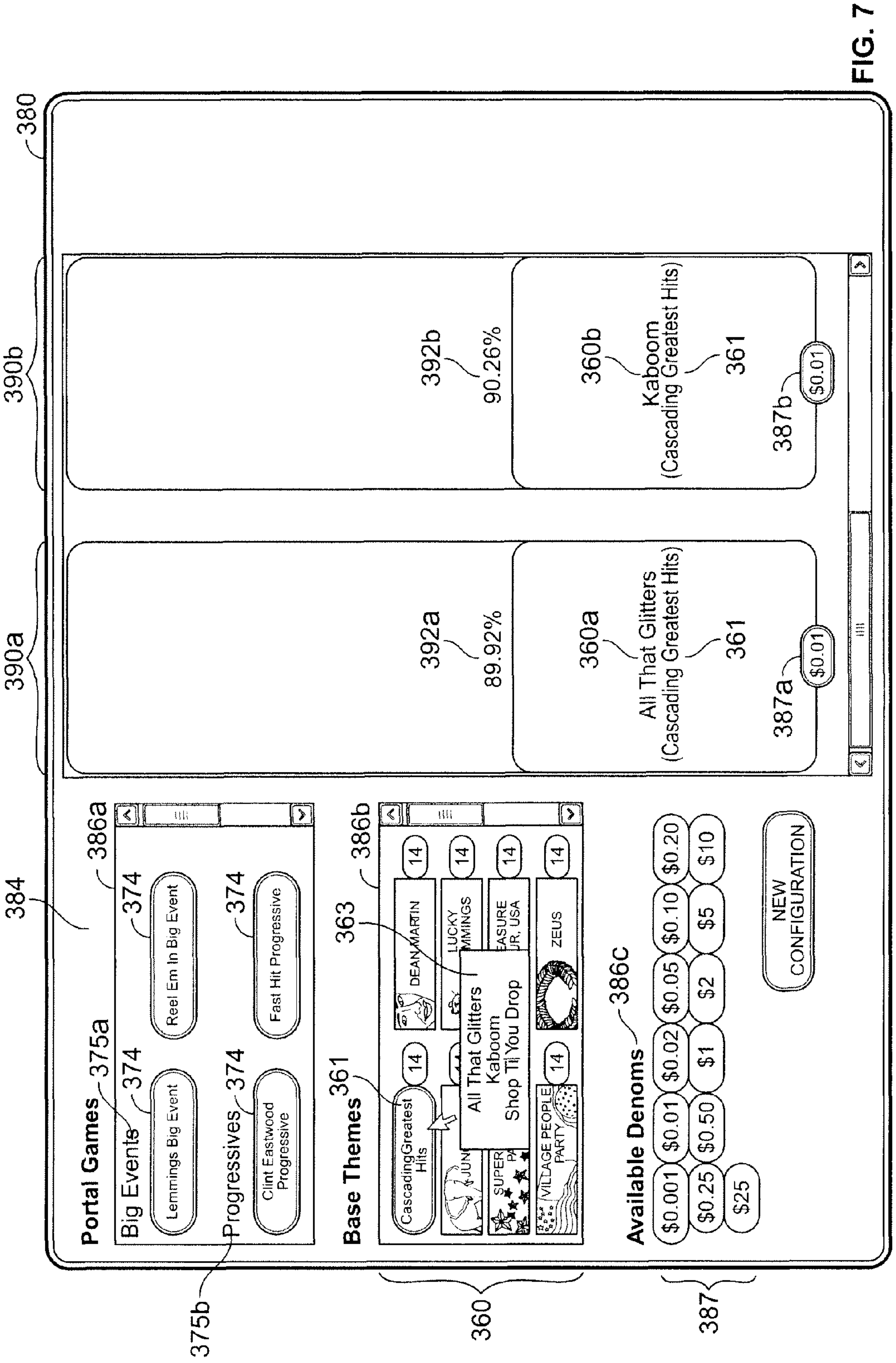
FIG. 7 is another screen shot of the control terminal of FIG. 4, showing configuration of a themed set of wagering games.

Turning to FIG. 7, the operator control interface 380 and control screen 384 are again displayed wherein the operator is configuring one or more theme sets 361. By touching, mousing over, or clicking an available theme set 361 in the Base Themes category 386*b*, a theme set contents window 363 pops up and displays the primary wagering games 360 contained in the theme set 361. In this way, an operator can decide if the Base Themes 360 contained in the theme set 361 are those which the operator wishes to activate and configure. In the embodiment shown, the "Cascading Greatest Hits" theme set 361 includes the primary wagering games 360 of "All That Glitters" 360*a*, "Kaboom" 360*b* and "Shop Til You Drop" 360*c*, which are displayed in the theme set contents window 363. The operator uses the same input technique to drag and drop the selected theme set 361 to the right side of the configuration screen 384. By doing so, the theme set 361 is opened, and a new configuration 390*a,b* is opened for each of the primary wagering games 360*a,b* in the theme set 361. Thus, a first configuration 390*a* corresponds to a first primary wagering game 360*a* ("All That Glitters") of the theme set 361. Similarly, a second configuration 390*b* corresponds to a second primary wagering game 360*b* ("Kaboom") of the theme set 361. A third configuration (not shown) is opened for the third primary wagering game 360*c* ("Shop Til You Drop") of the theme set 361, and may be accessed by manipulation of the menu bar at the bottom of the control screen 384.

As before, each of the configurations 390*a,b* includes a display of an overall payback percentage 392*a,b*. Moreover, each configuration 390*a,b* displays both the name of the primary wagering game 360*a*, as well as (in parentheses) the name of the theme set 361 (Cascading Greatest Hits) to which it belongs. Also as explained before, each configuration 390*a,b* is still configurable by denomination 387*a,b*. Thus, although a new configuration 390*a,b* is created for each Base Theme 360*a,b* in the theme set 361, the operator can still make one configuration 390*a* available on certain denominations 387*a*, while a second configuration 390*b* is available on other denominations 387*b*. In the embodiment shown, the operator is free to drag and drop Portal Games 374 to the various configurations 390*a,b*. Because the configurations 390*a,b* are associated with a theme set 361, dragging and dropping a Portal Game 374 onto one of the configurations 390*a,b* will cause it to be added to all of the configurations 390*a,b* for that theme set. Of course, the operator can remove features 374 from certain configurations 390*a,b* should he see fit to do so. The operator may also remove entire configurations 390*a,b* if they are undesirable, or may modify their configurations as he sees fit.

In alternative embodiments, a large variety of input commands may be usable by the operator through any appropriate input device, such as a touch screen or mouse. The operator can remove Base Themes 360 and Portal Games 374 by dragging and dropping off of the configuration 390, or by using a delete keystroke or mouse click. Entire configurations 390 may be removed in a similar fashion, or may copied, cut, pasted, etc. Moreover, various elements can be set as default parameters, such as default denominations 387, numbers of paylines, payback percentages, etc. Various colors may be used as well. For example, a selected color may be used to signify default components, such that an operator can tell whether a particular configuration 390 includes components which have been modified or not. Moreover, using the input devices discussed, an operator can change the default components for future use.

As used herein the term "theme" or "themes" is used to signify one or more of the base games, also referred to as "primary wagering games," such as the one displayed in FIG. 3. "Portal games" refers to, and may be utilized interchangeably with the words "supplemental features," and signifies one or more supplemental features, games, or activities in which a player may participate in addition to playing one of the primary wagering games.

As used herein, a "payback percentage" refers to one or more numbers which signify a theoretical mathematical value associated with a gaming device or system indicating a theoretical percentage or proportion of wagers which will be either returned to players via awards or retained by an operator of the gaming device or system. One example of a payback percentage is referred to as a "payout percentage," which is a theoretical average percentage of all wagers input into a gaming device or system which are returned or dispensed to players in the form of awards. Another example is a "hold percentage" which is the theoretical average percentage of all wagers input into a gaming device or system that are held, earned or retained by an operator of the gaming device or system. A payout percentage and a hold percentage are related in that they sum to 100%. For example, if a gaming device has a 95% payout percentage, it will have a 5% hold percentage. This means that over many plays of wagering games on the gaming device, a theoretical 95% of all wagers input into the device will be dispensed or returned to players in the form of one or more awards. Likewise, a theoretical 5% of all wagers input into the device will be retained by the operator. A "payback percentage" as used herein can be a payout percentage, a hold percentage, or any other number or index which indicates or provides information relating to mathematical probabilities and theoretical expectations as to what portion of wagers input into a gaming system will be returned and/or what portion will be retained or held.

As described, in an embodiment, selection and activation of one of the features 374 requires input of an additional wager in the form of a secondary wager, side bet, or other monetary input. Thus, in one embodiment, selection of a desired feature 374 causes a player's wager account to be debited in an appropriate amount associated with the feature. In an alternative embodiment, one or more of the features 374 may be activated or selected without placing additional wagers or incurring additional fees. In yet another alternative embodiment, the cost of additional features 374 may be debited from or supplied by player loyalty points, frequent player points, comps, player tracking card points, a designated feature fund, or other collected secondary economy accounts, instead of or in addition to currency wagers.

An overall payback percentage 392 displayed on a configuration 390 is calculated automatically, for the activated denomination, and is a function of the primary payback percentage of the Installed Theme 360, the wager amount on the primary wagering game (a minimum qualifying primary wager), a feature payback percentage of any activated feature 374, and any Side Bet amount required to play the feature 374.

An overall payback percentage 392 of a configuration 390 (the payback percentage of the primary wagering game 360 plus one or more activated portal games or supplemental features) may be calculated as a function of the primary payback percentage (the payback percentage of the primary wagering game 360) as well as the feature payback percentages of any of the portal games or features 374 which have been enabled. When activated, the primary wagering game 360 is configured or set to a primary payback percentage (as seen in FIG. 5, for "Zeus" theme it is 86.75%), which can be the same or different based upon denomination. This primary payback percentage may be adjusted (upward or downward) in response to activation of one or more of the portal games 374. Each of the portal games has its own corresponding feature payback percentage (see FIG. 5, for example, "Reel Em In Big Event" feature 374 has a 96.02% feature payback percentage) that may be higher or lower than the corresponding primary payback percentage. Thus, the overall payback percentage for each denomination is a function of, and affected by, the feature payback percentages of each activated features. The overall payback percentage is also a function of the relative sizes of the primary wager (the minimum qualifying primary wager of the primary wagering game 360 making the player eligible to play the supplemental feature) and any required supplemental wagers (Side Bets) for activating the selected portal game. Thus, in an embodiment, the overall payback percentage is given by Equation 1 below, wherein "OPP" stands for overall payback percentage, "PPP" stands for primary payback percentage, and "FPP" stands for feature payback percentage:

$$OPP = \frac{(PPP)(Bet_{Primary}) + (FPP_1)(\text{Side } Bet_1) + (FPP_2)(\text{Side } Bet_2)}{Bet_{Total}} \quad \text{Equation 1}$$

As seen, changes in the payback percentages of either the primary wagering game or any of the activated bonus features affect the overall payback percentage. Moreover, changes in the unit Side Bet amount also affect the overall payback percentage of a primary wagering game (per denomination). Also, activation of additional bonus features would further affect the overall payback percentage. Thus, for a primary wagering game having a primary payback percentage and a minimum qualifying primary wager, having at least one bonus feature activated, the general equation for the overall payback percentage is given in Equation 2, where N features are enabled, each having a unit Side Bet amount:

$$OPP = \frac{(PPP)(Wager_{Primary}) + \sum_{X=1}^{N} (FPP_x)(\text{Side } Bet_x)}{Bet_{Total}} \quad \text{Equation 2}$$

In an embodiment, activation of successive additional features 374 causes the overall payback percentage to increase. In other words, with each successive feature that is enabled, the overall payback percentage increases due to the addition of a feature 374 having a higher payback percentage. However, although features 374 having increasingly higher payback percentages are permitted to be activated, in an embodiment one or more rules of a rule set may limit the overall payback percentage to be within a predefined range. Thus, for example, the overall payback percentage of a particular base game theme and one or more activated portal games may be limited, for example, to be within the range of 80% to 98%. Other embodiments and configurations are possible as well. Various controls or mechanisms may be used by the rule set to accomplish such a limiting function. For example, features 374 or subsets thereof may be deactivated so as to be unable to be selected if activation would force the overall payback percentage out of the allowable range.

The control screen 384 and other elements displayed to the operator in the FIGURES herein are only examples of possible configurations of the system 300. Many other configurations may be used so as to allow an operator to view, select, and configure primary wagering games and available portal games and supplemental features. The various configurations may use graphical displays to visually link supplemental features with primary wagering games. Moreover, the control screen may permit configuration of parameters of wagering games beyond those described herein and displayed in the FIGURES. In alternative embodiment, the control screen 384 is contained in a handheld device which the operator may use to configure one or more primary wagering games and/or features as he walks through a casino floor, for example. In such an embodiment, the handheld device may be in communication with a central configuration server or computer, or the handheld device itself may comprise the control terminal discussed herein.

Figure 8:
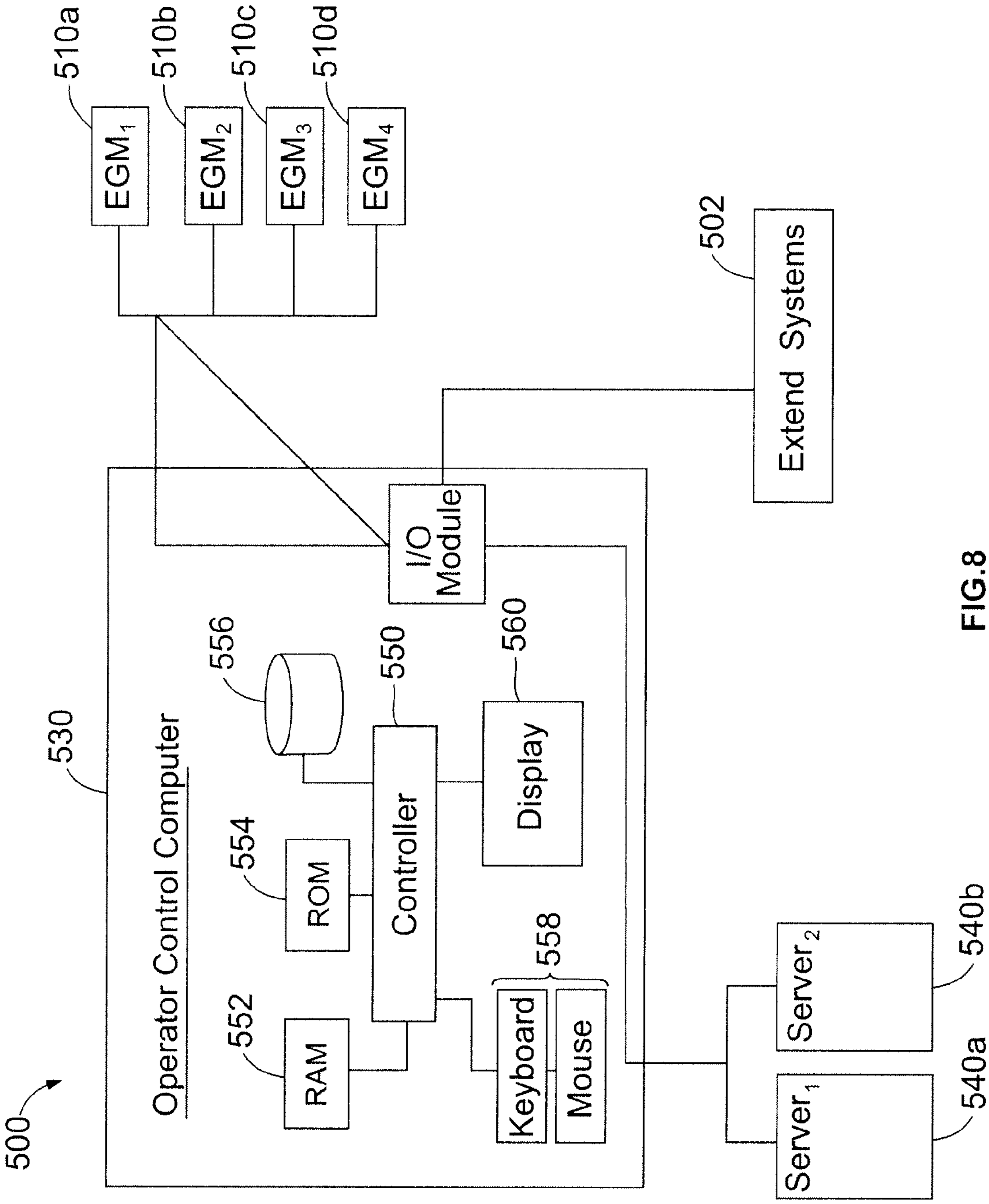
FIG. 8 is a diagram of a gaming system including an operator control computer for storing, executing and implementing software tools for categorizing wagers and metering performance of wagering games and supplemental features.

In another embodiment of the invention shown in FIG. 8, a gaming system 500 includes tools for categorizing wagers and metering performance of various wagering games and supplemental features available on the system 500. The system 500 includes an operator control computer 530 which is in communication with a plurality of gaming devices 510*a, b,c,d* such as the gaming devices shown and described with reference to FIGS. 1*a* and 1*b*. The gaming devices 510*a,b,c,d* may be either freestanding devices or handheld devices. The operator control computer 530 may further be in communication with one or more servers 540 which may store necessary data, programs, and software for the system 500.

The operator control computer 530 includes a central processing unit (microprocessor) 550 which is supported by read-only memory (ROM) 552, random access memory (RAM) 554, and a nonvolatile storage memory such as a hard drive 556. Input devices 558 such as a keyboard and/or mouse support the local entry of data and/or commands. Output devices 560 such as a monitor or display support the conveyance of information to a local operator. A communications input/output module 562 facilities bidirectional communications between the CPU 550 and external nodes over a wired or wireless communications link. As will be appreciated by those skilled in the art, the functionality provided by the structure shown in FIG. 8 is determined by the system level software and applications that provide operational control of it. Program control instructions are initially stored in ROM 552 and the hard drive 556. Following the initial boot-up process, at least part of the program control instructions is loaded into the RAM 554 to facilitate run-time operation. One or more application programs running on the structure provide higher level functionality associated with the respective nodes. For example, one or more of the servers 540*a,b* store various wagering games and provides critical recordkeeping, accounting and data support associated with the play of such wagering games.

The operator control computer 530 is configured to perform the functions of creating and managing wager categories, as described further herein. Moreover, the operator control computer 530 performs accounting tasks, such as metering of wagers into the system 500 as described further herein. The operator control computer 530 may interface with other programs on the server 540, such as accounting systems, operating systems, game configuration software, etc. These functions could also be done by the gaming machine itself.

One of the functions of the operator control computer 530 is to create and store wager categories which are dependent upon the configuration selections of an operator, such as which base games to activate, and which portal games to associate with each base game. As described with reference to FIGS. 4-7, an operator can create a wagering game configuration, which is a combination of a base game and one or more portal games. These configurations can be performed on a "per-denomination" basis, such that an operator can configure a base game differently based upon denomination. Once a wagering game configuration is created by an operator, the operator control computer 530 creates a plurality of wager categories based upon the configuration, as described herein.

As used herein, a "base game" refers to a primary wagering game, such as the slot game described with reference to FIG. 3. A base game can be played by itself, through placing a wager, and activating a play (e.g. a "spin") of the game. As used herein, a "portal game" or "supplemental feature" is activated in addition to one or more base games, and thus a portal game cannot be played individually separate from a base game. When a player plays a base game, the player may (optionally) simultaneously play one or more portal games also.

Each portal game offered by the system 500 may include one or more portal characteristics. Some of the characteristics of the various portal games include scope, trigger, and eligibility characteristics. Table 1 below provides examples of these types of portal characteristics. For example, under the "scope" characteristic, a portal game may be a linked portal game or a standalone portal game. As seen under the Description column in Table 1, a linked portal game receives contributions from multiple EGMs (electronic gaming machines, such as the gaming devices shown and described with reference to FIGS. 1*a* and 1*b*, for example). A standalone portal game receives contributions from a single EGM. With respect to the triggering mechanisms used, the portal game may be triggered by the base game (for example as a result of a certain combination of reel symbols), or may be triggered by itself (independently of the base game). Eligibility to play or participate in a portal game may be paid for, via a side wager, or may be "free" or "zero-cost" in the sense that the portal game may be activated at zero additional cost (no side wager necessary, but still necessary to place a primary wager on the base game.

TABLE 1

| Portal Characteristics | | |
|---|---|---|
| Characteristic | Values | Description |
| Scope | Linked/ Standalone | A linked portal is a portal game in which multiple EGMs contribute to and vie for a common jackpot. A standalone portal is a portal game in which only a single EGM contributes and vies for an award. |
| Trigger | Base Game/ Self | The trigger defines which software entity causes the portal to pay out a win. A base game triggered portal is a portal which is played and an outcome generated only upon instruction from the base game. A self-triggered portal is a portal which informs the base game when a win has occurred on the portal. |
| Eligibility | Pay-for/ Zero cost | The eligibility defines what requirements the player must meet in order to become eligible to win a portal award. In a pay-for portal, the player must make an additional side wager on the base game in order to become eligible. In a zero-cost portal, no additional side wager is required. Once eligible, the player receives an opportunity to win (e.g. an entry into the portal game), or some time period of eligibility. |

An example of a "pay-for" portal game is illustrated. Suppose that a player makes a wager of 10 credits×10 pay lines plus an additional 1-credit side wager for a pay-for portal. This is a total bet of 101 credits. The base game payout is based on a 100-credit wager, and therefore its expected value (Base Game EV) is computed independent of the additional side wager. The portal payout is based on a 1-credit wager, and therefore its expected value (Portal Game EV) is computed independent of the base game wager. Because the player must make a side wager (1 credit in this instance), the portal game is a "pay-for" portal.

A "zero-cost" portal differs as described in this example. Suppose that a player makes a wager of 10 credits×10 paylines on a zero-cost portal in which 2% of all coin in contributes to some jackpot. The base game sees a wager of 100 credits, and the portal sees a wager of 2 credits, for a total of 102 credits. However, the player actually only wagers 100 credits. The additional 2 credits came from the fact that part of the player's wager applied to two games simultaneously. This is in fact what zero-cost means: it means that part of the player's primary wager applies to the portal game and base game simultaneously (hence, it seems like the portal game was free to the player). Thus, as discussed herein, a zero-cost portal game (when activated) will affect an overall payback percentage of the wagering game, even though it does not require a separate additional side wager from a player.

The gaming system 500 may employ many different types of features, or portal games, as discussed herein. The portal games may include progressives, bonus rounds, multiple base games simultaneously, and player game customization, each of which is described further below.

Progressives.

All progressive jackpot games, be they linked or standalone, could be built using portal games. A typical "traditional" progressive would be implemented as a zero-cost portal: some small percentage of the total wager would also be applied to the progressive jackpot. A progressive jackpot which is a "Buy-a-Progressive" feature would be implemented as a pay-for portal, thereby requiring a side wager.

Bonus Rounds.

All bonus rounds could be built using the portal architecture.

Playing Multiple Base Games Simultaneously.

It is also possible to enable the player to play multiple base games simultaneously (or at least have them viewable on screen simultaneously). In this case, one of the base games would occupy most of the screen and the second base game would run in a smaller "window" on the screen. Although it has been common practice to refer to the second (smaller) base game as a portal, for the purposes of this document it is a base game because it directly accepts wagers from the player. Multiple base games can link to the same portal game.

Player Game Customization.

Perhaps the ultimate goal of portals is to allow the player to pick and choose which portals are associated with the base game they are playing. In one embodiment, an operator is responsible for pre-configuring which portals are associated with which base games, as discussed with reference to FIGS. 4-7 herein. In such an embodiment, the player is not given an option, except that he or she may opt not to play the pay-for portals on a particular EGM. However, in alternative embodiments, a player may be permitted to activate any portal games with any base games, and with any denomination thereof.

One of the main benefits of the system 500 shown and described herein is the ability to create wager categories based upon activated wagering game configurations, and the ability to meter all portal activity against the currently active base game paytable using the created wager categories.

Wager Categories

Wager Categories for Zero Cost Portals

Wager categories are created and stored differently by the system 500 based upon whether the portal games added to the wagering game configuration are "pay-for" portals or "zero-cost" portals. First, creation of wager categories for zero-cost portals is explained. Zero-cost portals do not have wagers in and of themselves; rather, typically a percentage of the overall base game wager (primary wager) is also applied to the zero-cost portal. Participation in a zero-cost portal could, however, be subject to a minimum bet requirement, or other eligibility requirement. As an example, most traditional progressive jackpot features require the player to make a max bet wager in order to be eligible. If there are no minimum bet requirements for a zero-cost portal, then every base game spin equates to a zero-cost portal "spin", and by definition there is only one wager category, which is the EV of the base game paytable plus the EV of the zero-cost portal. If there is a minimum bet requirement for a zero-cost portal, then there are potentially two wager categories of the base game paytable: the first category would be just the EV of the base game paytable without the portal (where the wager did not meet the minimum bet requirement) and the second would be the EV of the base game plus the EV of the zero-cost portal. In one embodiment, this second wager category is only needed if the EV of the portal exceeds 4%, which corresponds to one accounting protocol which only requires different wager categories if two wagers on the same paytable yield a 4% or greater difference in EV. In such an embodiment, if the two wagers yielded less than a 4% spread, wager categories are not strictly required, but not restricted either. In another embodiment, a second wager category is created regardless of how small the difference in EV between wagers.

An example of creating wager categories is explained. Let us assume that BG is the base game and BGPT is the active paytable which has a payback of 88%. Also assume that ZC_A and ZC_B are zero-cost portals. ZC_A has no minimum bet requirement but ZC_B requires max bet. Further assume that both ZC_A and ZC_B consume 1% of all coin-in and pay back all 1% at some random time (they are the same kind of portal except that one requires the player to play max bet). Finally, let us assume that BGPT is configured for $1.00 denom and has a max bet of $45.00 (from 1 to 45 credits). The system 500 will create two wager categories, BG+ZC_A and BG+ZC_A+ZC_B. This occurs as a result of examining the range of possible wager by the player. The player can wager anywhere between 1 and 45 credits. If he wagers anything between 1 and 44 credits, inclusive, he will be eligible to participate in the base game BG, as well as in the first zero-cost portal ZC_A. However, since 1-44 credits is not a maximum bet, he will not be eligible for ZC_B. Thus, the first wager category which applies to wagers of 1 to 44 credits is BG+ZC_A. This leaves only a wager of 45 credits, which qualifies the player for participation in the BG, ZC_A, and ZC_B (since it is a maximum wager). Thus, the second wager category is BG+ZC_A+ZC_B.

Once these two wager categories are created, the system 500 uses a metering function to account for wagers which are placed in the various wager categories. When a wager is received by the system 500, the wager is evaluated to see if it falls into the first wager category (in this case 1-44 credits) or the second wager category (in this case 45 credits). If it falls into the first wager category, the BG is incremented by the full wager amount since the wager does not meet the minimum bet requirement for ZC_B. In this example, wagers of this kind (first wager category) have an EV of 88% (BGPT) plus 1% (ZC_A)=89%. If the wager falls into the second wager category, the metering function of the system 500 increments ZC_B by the full wager amount any time the player makes a wager that meets the minimum bet requirement for eligibility in ZC_B.

The metering function of the system 500 is illustrated by the following examples using the wager categories created. The values in the Coin In Meter column represent the increment to be applied to the respective coin-in meter for the wager category and not the final value of the meter.

Example 1

Player wagers $15.00 (15 credits), not eligible for ZC_B.

| Wager Category | EV | Coin In Meter |
|---|---|---|
| BG + ZC_A | 89% | $15.00 |
| BG + ZC_A + ZC_B | 90% | $ 0.00 |

Example 2

Player wagers $45.00 (45 credits), which is a maximum wager, making them eligible for both ZC_A and ZC_B.

| Wager Category | EV | Coin In Meter |
|---|---|---|
| BG + ZC_A | 89% | $ 0.00 |
| BG_ZC_A + ZC_B | 90% | $45.00 |

Thus, as seen in the above examples, when a wager is between 1 and 44 credits, the metering function of the system 500 adds the credits to the first wager category. Likewise, when the wager is 45 credits, the metering function of the system 500 adds the credits to the second wager category.

Suppose that a third zero-cost portal (ZC_C) is now added to the active configuration by the operator. Let us assume that ZC_C is a zero-cost portal with a minimum bet requirement of $15.00 (15 credits) and that ZC_C works in a similar fashion to ZC_A and ZC_B. The activation of ZC_C (along with ZC_A and ZC_B) causes the system to create three wager categories. The first wager category now corresponds to wagers between $0.00-$14.00 (0 to 14 credits), where the player is eligible only for ZC_A, which means that the total EV is 88%+1%=89%. The second wager category corresponds to wagers between $15.00-$44.00 (15-44 credits), where the player is eligible for both ZC_A and ZC_C, but not ZC_B since they did not play max bet. That makes the total EV for this wager 88%+1%+1%=90%. The third wager category is for max bet wagers of $45.00 (45 credits), where the player is eligible for all three portals which makes the total EV 91%.

The metering function of the system 500 is again illustrated in the following examples, now using the three wager categories created.

Example 3

Player wagers $10.00 (10 credits), not eligible for ZC_B or ZC_C.

| Wager Category | EV | Coin In Meter |
|---|---|---|
| BG + ZC_A | 89% | $10.00 |
| BG + ZC_B + ZC_C | 91% | $ 0.00 |
| BG + ZC_C | 90% | $ 0.00 |

Example 4

Player wagers $30.00 (30 credits), making them eligible for both ZC_A and ZC_C.

| Wager Category | EV | Coin In Meter |
|---|---|---|
| BG + ZC_A | 89% | $ 0.00 |
| BG + ZC_B + ZC_C | 91% | $ 0.00 |
| BG + ZC_C | 90% | $30.00 |

Example 5

Player wagers $45.00 (45 credits), making them eligible for all three portals.

| Wager Category | EV | Coin In Meter |
|---|---|---|
| BG + ZC_A | 89% | $ 0.00 |
| BG + ZC_B + ZC_C | 91% | $45.00 |
| BG + ZC_C | 90% | $ 0.00 |

Thus, as seen in the above examples, when a wager is between 1 and 14 credits, the metering function of the system 500 adds the credits to the first wager category. Similarly, when the wager is between 15 and 44 credits, the metering function of the system 500 adds the credits to the second wager category. Likewise, when the wager is 45 credits, the metering function of the system 500 adds the credits to the third wager category. Therefore, with zero-cost portals, activation of additional portals causes additional permutations of wager categories in combination with the base game.

Wager Categories for Pay for Portals

The system 500 creates wager categories for pay-for portals in a different way. Pay-for portals have their own wager (a side wager) which could be one or more credits. Because a player can choose to play or not to play a pay-for portal, mere existence of the pay-for portal can require the base game paytable to have two wager categories—one for the case where the player opts in, and one for the case where the player opts out. Moreover, since pay-for portals can have multiple bet levels, pay-for portals in and of themselves can have multiple wager categories.

Here are some examples of creation of wager categories for pay-for portals, and metering credits received with respect to such wager categories. Let us assume that BG is the base game and BGPT is the active paytable which has a payback of 92% at max bet and 87% for lesser bets. Also assume that PF_A and PF_B are pay-for portals with bet levels of 0, 1, or 2 credits. PF_A pays out 89% at 1 credit and 91% at 2 credits. PF_B pays out 90% at 1 credit and 95% at 2 credits. Finally, let us assume that BGPT is configured for $1.00 denom (1 credit) and that the maximum wager is $45.00 (45 credits).

The system 500 creates at least one wager category for each pay-for portal. In instances where a pay-for portal has multiple wager levels, the system 500 creates multiple wager categories for that pay-for portal. Thus, referring to the example configuration above, Table 2 below shows the different wager categories and the EV of each:

TABLE 2

| Wager Category | EV |
|---|---|
| BG-WC1 | 87% |
| BG-WC2 | 92% |
| PF_A-WC1 | 89% |
| PF_A-WC2 | 91% |
| PF_B-WC1 | 90% |
| PF_B-WC2 | 95% |

In Table 2, 'WC1' refers to wager category 1, and "WC2" refers to wager category two. Thus, the base game itself has two wager categories (BG-WC1 and BG-WC2). This is because for wagers of 1 to 44 credits, the base game is configured to have an expected value of 87%, but if the player places a max bet of 45 credits, the base game has an expected value of 92%. Similarly, each of the pay-for portals has two wager categories, because each pay-for portal provides a different expected value for one credit side-wagers than for two credit side-wagers.

When a wager is made, more than one wager category may be metered, based upon how many credits the player chooses to wager on the base game (primary wager) and on each pay-for portal (side wagers). Here are some examples that illustrate how the system 500 meters of pay-for portals.

Example 6

Player wagers $15.00 on the base game and $1.00 (1 credit) on PF_A.

| Wager Category | EV | Coin In Meter |
|---|---|---|
| BG-WC1 | 87% | $15.00 |
| BG-WC2 | 92% | $ 0.00 |
| PF_A-WC1 | 89% | $ 1.00 |
| PF_A-WC2 | 91% | $ 0.00 |
| PF_B-WC1 | 90% | $ 0.00 |
| PF_B-WC2 | 95% | $ 0.00 |

Example 7

Player wagers $30.00 on BG, $2.00 on PF_A, and $1.00 on PF_B.

| Wager Category | EV | Coin In Meter |
|---|---|---|
| BG-WC1 | 87% | $30.00 |
| BG-WC2 | 92% | $ 0.00 |
| PF_A-WC1 | 89% | $ 0.00 |
| PF_A-WC2 | 91% | $ 2.00 |
| PF_B-WC1 | 90% | $ 1.00 |
| PF_B-WC2 | 95% | $ 0.00 |

Example 8

Player wagers $45.00 (max bet) on BG and $2.00 each on PF_A and PF_B.

| Wager Category | EV | Coin In Meter |
|---|---|---|
| BG-WC1 | 87% | $ 0.00 |
| BG-WC2 | 92% | $45.00 |
| PF_A-WC1 | 89% | $ 0.00 |
| PF_A-WC2 | 91% | $ 2.00 |
| PF_B-WC1 | 90% | $ 0.00 |
| PF_B-WC2 | 95% | $ 2.00 |

Wager Categories and Metering for Combinations Having Both Pay-for and Zero-Cost Portals The system 500 can create wager categories for wagering game configurations which include both pay-for portals and zero-cost portals. Moreover, the system 500 can further create wager categories for configurations in which the base game itself has multiple wager categories (different expected values for different wager amounts or ranges). The following example shows how the system 500 creates wager categories for a complex configuration including a base game with a plurality of expected values based upon wager size, pay-for portals and zero-cost portals.

For the following example, the following assumptions are made:

Zero cost portal ZC_A, requires no minimum bet, consumes 1% of total coin-in and pays out all 1% at some random time.

Zero cost portal ZC_B, minimum bet 15 credits, consumes 2% of total coin-in and pays out all 2% at some random time.

Zero cost portal ZC_C, minimum bet 30 credits, consumes 3% of total coin-in and pays out all 3% at some random time.

Pay-for portal PF_A, bet levels 0, 1, and 2 credits, with two wager categories—87% @ 1 credit and 92% @ 2 credits.

Pay-for portal PF_B, bet levels 0, 1, and 2 credits, pays out 90% at all bet levels.

Base game BG configured with paytable BGPT_A configured for $1.00 (1 credit) denomination and max bet $45.00 (45 credits), with two wager categories—93% at max bet and 89% for lesser bets. BGPT_A is linked with ZC_A, ZC_C, PF_A, and PF_B.

Base game BG also configured with paytable BGPT_B configured for $0.25 (1 credit) denomination and max bet $11.25 (45 credits) pays out 88% at all bet levels. BGPT_B is linked with ZC_B, PF_A, and PF_B.

There are two active base game paytables here, and therefore two complete meter sets, each with multiple wager categories. Thus, the system 500 meters separately for separate base game paytables. The following Table 3 shows the meter sets and wager categories.

TABLE 3

| Paytable: BGPT_A |
|---|
| BGPT_A-WC1 + ZC_A |
| BGPT_A-WC1 + ZC_A + ZC_C |
| BGPT_A-WC2 + ZC_A |
| BGPT_A-WC2 + ZC_A + ZC_C |
| PF_A-WC1 |
| PF_A-WC2 |
| PF_B |
| **Paytable: BGPT_B** |
| BGPT_B |
| BGPT_B + ZC_B |
| PF_A-WC1 |
| PF_A-WC2 |
| PF_B |

It should be noted that as defined, wager category BGPT_A-WC2+ZC_A can never be metered because BGPT_A-C2 requires a bet of $45.00 (45 credits), and eligibility in ZC_C is achieved with a bet of only $30.00 (30 credits). Therefore, a player can never play BGPT_A-WC2 without also playing ZC_C. However, the wager category is shown above anyway. The system 500, in an embodiment, may activate mechanisms to prune or eliminate "impossible" wager categories.

Example 9

$10.00 wager on BGPT_A, $2.00 wager on PF_A, $1.00 wager on PF_B.

| Paytable: BGPT_A<br>Wager Category | Coin In Meter |
|---|---|
| BGPT_A-WC1 + ZC_A | $10.00 |
| BGPT_A-WC1 + ZC_A + ZC_C | $ 0.00 |
| BGPT_A-WC2 + ZC_A | $ 0.00 |
| BGPT_A-WC2 + ZC_A + ZC_C | $ 0.00 |
| PF_A-WC1 | $ 0.00 |
| PF_A-WC2 | $ 2.00 |
| PF_B | $ 1.00 |

Example 10

$30.00 wager on BGPT_A, $1.00 wager on PF_A, no wager on PF_B.

| Paytable: BGPT_A<br>Wager Category | Coin In Meter |
|---|---|
| BGPT_A-WC1 + ZC_A | $ 0.00 |
| BGPT_A-WC1 + ZC_A + ZC_C | $30.00 |
| BGPT_A-WC2 + ZC_A | $ 0.00 |
| BGPT_A-WC2 + ZC_A + ZC_C | $ 0.00 |
| PF_A-WC1 | $ 1.00 |
| PF_A-WC2 | $ 0.00 |
| PF_B | $ 0.00 |

Example 11

Max bet on BGPT_A, $1.00 wager on PF_A, $2.00 wager on PF_B.

| Paytable: BGPT_A<br>Wager Category | Coin In Meter |
|---|---|
| BGPT_A-WC1 + ZC_A | $ 0.00 |
| BGPT_A-WC1 + ZC_A + ZC_C | $ 0.00 |
| BGPT_A-WC2 + ZC_A | $ 0.00 |
| BGPT_A-WC2 + ZC_A + ZC_C | $45.00 |
| PF_A-WC1 | $ 1.00 |
| PF_A-WC2 | $ 0.00 |
| PF_B | $ 2.00 |

Example 12

$2.00 wager on BGPT_B, $0.50 wager on PF_A, $0.25 wager on PF_B

| Paytable: BGPT_B<br>Wager Category | Coin In Meter |
|---|---|
| BGPT_B | $2.00 |
| BGPT_B + ZC_B | $0.00 |
| PF_A-WC1 | $0.00 |
| PF_A-WC2 | $0.50 |
| PF_B | $0.25 |

Example 13

$10.00 wager on BGPT_B, $0.25 wager on PF_A.

| Paytable: BGPT_B<br>Wager Category | Coin In Meter |
|---|---|
| BGPT_B | $ 0.00 |
| BGPT_B + ZC_B | $10.00 |
| PF_A-WC1 | $ 0.25 |
| PF_A-WC2 | $ 0.00 |
| PF_B | $ 0.00 |

When a wager is made via the base game, the game and/or relevant game component must gather the wagers from the base game and all pay-for portals and report the wagers to the system 500. When the report is made, the report must contain a list of wagers rather than a summation. The list must be of a form equivalent to a mapping of wager categories to wager amounts specified in monetary units.

Thus, as seen from the examples herein, the system 500 provides a metering function which accounts for all wagers received by the system 500 by assigning each such wager to an appropriate wager category which has been created for the relevant wagering game configuration or combination. As used herein, "metering" means keeping track of and accounting for all wagers received into ("coin-in") the system 500, including by way of assigning wagers to appropriate associated wager categories. In other embodiments, metering may also include tracking of awards paid out of the system 500 ("coin out"), number of games played, etc. The purpose of metering is to monitor performance of wager games to for purposes of comparing actual performance (actual expected value) of such games against their theoretical expected value. Thus, metering is a form of monetary reconciliation. In the examples described herein, the system 500 uses a method of aggregate metering, which involves assigning wagers to one or more wager categories when such wagers are received. In the case of zero-cost portals, the aggregate metering method assigns the entire primary wager received to one wager category, where each wager category is a permutation of the base game wager category. In the case of pay-for portals, the aggregate metering method assigns the entire primary wager to one wager category, and any relevant side wagers to the associated wager categories for the pay-for portals.

In an alternative embodiment, metering may be done on a component by component basis. For example, operators may be interested in how the various pay-for portals are performing, just as they are interested in knowing which game themes are played more than others. To that end, it is possible for the system 500 to maintain separate coin-in/coin-out meters for each portal as well. Thus, in addition to, or instead of the aggregate metering described herein, the system 500 may meter each component of a configuration separately, and provide performance data therefore.

EV Calculations and Paytables

As described in the various embodiments and examples herein, the system 500 assigns or calculates an expected value (EV) for each wager category created. The assigned EV for each wager category may be reported to other components of the system 500, such as accounting software. In the portal environment, some dynamic calculation is necessary because some portal parameters that influence EV are operator configurable.

Computation of the EV of a portal paytable depends upon the portal type. It should be noted that some paytables have an EV specified as a minimum and maximum payback percentage, both of which are described below. A gaming device 510 (EGM) and the system 500, for different reasons, may be interested in both of these values. Moreover, the method used to compute the minimum and maximum differs in certain situations (namely progressives)

Zero-Cost/Standalone/Base-Game Triggered.

This is an EGM bonus round. The EV of the portal is actually built into the base game paytable. The minimum and maximum EVs of the portal are defined as credits won per trigger. In one embodiment, the system could define "portal classes." For example, every base game may have one or more bonus rounds built into it which are typically triggered by way of some base game event such as a particular reel combination. Each base game's math is defined such that the mathematician assigns a certain portion of the overall game EV to the bonus round itself, where the calculation of that EV, as a percentage, can have two components: a probability of triggering the bonus round and an average payback per trigger. Multiplying these two values gives you an EV specified as a percentage. The base game controls the probability of triggering, and the bonus round "controls" the average payback. Therefore, a set of portals could be defined all of which pay out a certain specific number of credits each time they are "triggered". This specific payback-per-trigger may be used to define a "class" of portals.

Zero-Cost/Linked/Base-Game Triggered.

This is a traditional progressive. The EV of this portal is defined as credits won per trigger. Calculation of the portal minimum EV requires knowledge of the reset amount (portal configuration parameter) but not contribution rates because regulations do not allow contribution to be included in paytable EVs for the purposes of satisfying minimum payback percentage. Calculation of the portal maximum EV also requires knowledge of the contribution rate.

Zero-Cost/Standalone/Self-Triggered.

Portal EV is defined as credits won per trigger. The portal minimum EV is calculable given the reset amount (portal configuration parameter) but not contribution rates because regulations do not allow contribution to be included in paytable EVs for the purposes of satisfying minimum payback percentage. The portal maximum EV is computed inclusive of contribution.

Zero-Cost/Linked/Self-Triggered.

Portal EV is defined as credits won per trigger. The portal EVs are calculable given the reset amount and contribution rates (portal configuration parameters). Note that because it is our intention to meter Fast Hit as paytable win rather than progressive win, it is possible to include the contribution rate in the portal EV.

Pay-for/Standalone/Self-Triggered.

Portal EV is defined as a payback percentage which is more easily calculable since the portal itself has coin-in. This percentage is available to the EGM locally.

Pay-for/Linked/Self-Triggered.

Portal EV is defined as a payback percentage which is more easily calculable since the portal itself has coin-in. This percentage resides on the server (CGC). The EGM must query the server for this value.

In some embodiments, the system 500 must ensure that wagering games which are playable must maintain an overall payback percentage (or EV) that is within a certain range. For example, gaming regulations may require that payback percentages for wagering games be between a minimum and maximum allowable payback percentage. In some embodiments, each component of the wagering game (for example, each portal game) must have an individual EV that is within a range allowed by relevant regulations. In other embodiments, regulations do not prohibit use of portals that are outside of the jurisdictionally accepted range of EVs, so long as such portals are coupled with base games (and/or other portals) such that an overall payback percentage (as described herein) is maintained within the jurisdictionally acceptable range of payback percentages. Thus, in some embodiments, portals could be used to augment an already legal paytable to a higher payback percentage and other ideas that portals could lower an overall payback percentage. Moreover, zero-cost portals (which have no minimum bet requirements) can be used to augment an invalid paytable (percentage too low) to a legal value by increasing an overall payback percentage.

Gaming devices 510 (EGMs) of the system may use the payback percentage of a paytable to report theoretical values (for example to an accounting system), as well as to compare the payback percentages against jurisdictional limits to ensure legality.

In the portal world, there must be no combination of base game wager and portal wager that yields a payback percentage below the minimum limit or above the maximum limit allowed within a certain regulatory jurisdiction. Furthermore, in an alternative embodiment, it may be desirable to require that all pay-for portals have payback percentages within the jurisdictional limits themselves, even though it is not possible to play a portal without also playing the base game. The minimum and maximum theoretical EVs of a paytable/portal combination shall be computed using an EV Calculator, described below. This tool must consider all possible combinations of wagers on the base game and pay-for portals and report both the maximum achievable EV and the minimum achievable EV.

Consider an example. For purposes of this example, the following assumptions are made.

- Zero cost portal ZC_A, no minimum bet, consumes 1.25% of total coin-in and pays out all 1.25% at some random time.
- Zero cost portal ZC_B, minimum bet 15 credits, consumes 2.10% of total coin-in and pays out all 2.10% at some random time.
- Pay-for portal PF_A, bet levels 0, 1, and 2 credits, with two wager categories—87.73% @ 1 credit and 92.05% @ 2 credits.
- Pay-for portal PF_B, bet levels 0, 1, and 2 credits, pays out 85.68% at all bet levels.
- Base game BG configured with paytable BGPT_A configured for $1.00 denomination and max bet $45.00, with two wager categories—93.56% at max bet and 89.98% for lesser bets. BGPT_A is linked with ZC_A, ZC_B, PF_A, and PF_B.

The EV Calculator must permute based upon wager to determine which wager has the minimum and maximum EV. Note that this permutation does not match the wager categories; it is more complicated than that. Also note that for table rows in which the base wager is a range, the EV is also specified as a range (because it is dependent upon wager level). Table 4 below shows the various EVs based upon range of base wager and the various wagers which can be placed on the two pay-for portals.

TABLE 4

| Base Wager (Credits) | PF_A Wager (Credits) | PF_B Wager (Credits) | EV |
|---|---|---|---|
| 1-14 | 0 | 0 | 89.98% |
| 15-44 | 0 | 0 | 89.98% |
| 45 | 0 | 0 | 93.56% |
| 1-14 | 0 | 1 | 87.83-89.69% |
| 15-44 | 0 | 1 | 89.71-89.88% |
| 45 | 0 | 1 | 93.39% |
| 1-14 | 0 | 2 | 87.11-89.44% |
| 15-44 | 0 | 2 | 89.47%-89.79% |
| 45 | 0 | 2 | 93.22% |
| 1-14 | 1 | 0 | 88.86-89.83% |
| 15-44 | 1 | 0 | 89.84-89.93% |
| 45 | 1 | 0 | 93.43% |
| 1-14 | 1 | 1 | 87.80-89.57% |
| 15-44 | 1 | 1 | 89.59-89.84% |
| 45 | 1 | 1 | 93.27% |
| 1-14 | 1 | 2 | 87.27-89.34% |
| 15-44 | 1 | 2 | 89.38-89.75% |
| 45 | 1 | 2 | 93.11% |
| 1-14 | 2 | 0 | 90.24-91.36% |
| 15-44 | 2 | 0 | 90.07-90.22% |
| 45 | 2 | 0 | 93.50% |
| 1-14 | 2 | 1 | 89.94-89.97% |
| 15-44 | 2 | 1 | 89.97-89.98% |
| 45 | 2 | 1 | 93.33% |
| 1-14 | 2 | 2 | 89.09-89.73% |
| 15-44 | 2 | 2 | 89.75-89.89% |
| 45 | 2 | 2 | 93.18% |

Therefore, the theoretical maximum that would be reported for this paytable/portal combination would be 93.56% (shown shaded in Table 4), achieved with max bet (45 credits) on the base game and no portal side wagers. The theoretical minimum that would be reported for this paytable/portal combination and used for comparison against jurisdictional limits is 87.11% (also shown shaded in Table 4), achieved with a bet level of 1 credit on the base game and 2 credits on portal PF_B. Note that even though PF_B itself has no wager categories, the EV calculator still has to permute all possible bet levels of PF_B in order to find the maximum and minimum values.

Thus, the EV calculator calculates an EV (or a range of EV) for every possible wager combination which may be played for the configured base game and associated portal games. By doing so, the EV calculator can determine an absolute maximum and minimum EV for the wagering game configuration, which is necessary for ensuring that the configuration complies with regulations. If one or more wagering combinations were determined to be outside of the regulatory range, the wagering game configuration would need to be re-configured to be legal.

In an embodiment, the EV Calculator is a tool that has two modes/functions:

Given a base game paytable, denomination, and a set of zero-cost and pay-for portal configurations, the EV calculator must run through all combinations of wagers and determine the following:

a. The set of wager categories required
b. The minimum payback percentage
c. The maximum payback percentage
d. The top award
e. The odds of winning the top award
f. The volatility index of the combination
g. A semi-unique accounting system paytable ID Given a base game paytable, denomination, and a set of zero-cost and pay-for portal configurations, the EV calculator must output a "virtual" PAR sheets (PAR stands for Patron Average Return) containing the accounting system paytable ID and any other relevant information present on PAR sheets, which are provided to regulators to ensure compliance with certain gaming regulations.

Given a base game paytable, denomination, a set of zero-cost and pay-for portal configurations, and a wager amount (including the breakdown of wager to base game and individual portal), the EV calculator must output the theoretical EV of the given wager or the wager category into which the coin in should be metered.

The EV Calculator is used by the system 500 to ensure that a given paytable/denomination combination creates a "virtual paytable" that falls within jurisdictional limits. This tool will also reside on the EGM for the purposes of performing the same check. A "standalone" version of the tool that can run on a PC/laptop may also be needed to aid regulatory approval and/or casino operators and/or WMS test personnel so that these individuals can run EV calculations without an AOM or EGM (as a way of independently verifying the output of the AOM and EGM versions).

An example of a PAR sheet is shown in FIGS. 9*a,b,c*. Historically, PAR sheets have been generated by manufacturers or gaming devices and submitted to gaming regulators so that certain configuration data and parameters of wagering games can be verified for compliance purposes. Thus, as seen in FIGS. 9*a,b,c*, the PAR sheet contains a variety of information relating to the configuration of a wagering game. A base game expected value (payback percentage) is included on the PAR sheet, at the top of FIG. 9*a*, which in this case.

With the system 500 of the current invention, when a wagering game configuration includes a base game and one or several portal games, calculation of the various parameters (such as the EVs shown in Table 4, for example) becomes exponentially more difficult. Generation of PAR sheets for every wager category and possible wager for a given configuration of base and portal games would be cumbersome. Thus, instead of generating a PAR sheet for each possible combination of base game and associated portal games, and each wager category therein, the EV Calculator (a standalone version, for example) may provide a software tool to regulators in which various wager combinations can be examined, checked, analyzed and verified. While generation of all possible PAR sheets could produce hundreds or thousands of pages of PAR sheets, the EV Calculator provides a software tool to regulators who can enter various data into the tool and see (or print) outputs for particular wager scenarios for which they seek information. A standalone version of the EV Calculator may be loaded on a computer, or may be stored on a CD-ROM, DVD-ROM, disk, or other appropriate storage media for use with a computer.

The systems as described and shown in various embodiments herein, offers a number of advantages over traditional systems. By allowing an operator to create and store wagering game configurations which include base games and various types of portal games, an operator can implement more exciting and entertaining wagering games within their facility. This in turn allows players to experience a greater number and variety of wagering game events including various portal games. Moreover, the systems described herein allow operators a method of accounting for wagers put into the system and awards paid out of the system. By creating wager categories as described herein and metering received wagers in accordance with such wager categories, the system provide a method of aggregate metering which allows for an efficient method of monetary reconciliation. Moreover, the system provides an EV calculator tool which can be used on the gaming devices or server of the system, or on a standalone version, to verify certain performance aspects and parameters of wagering game configurations on the system, for example, to ensure compliance with gaming regulations. Other benefits are provided as well.

Figure 10:
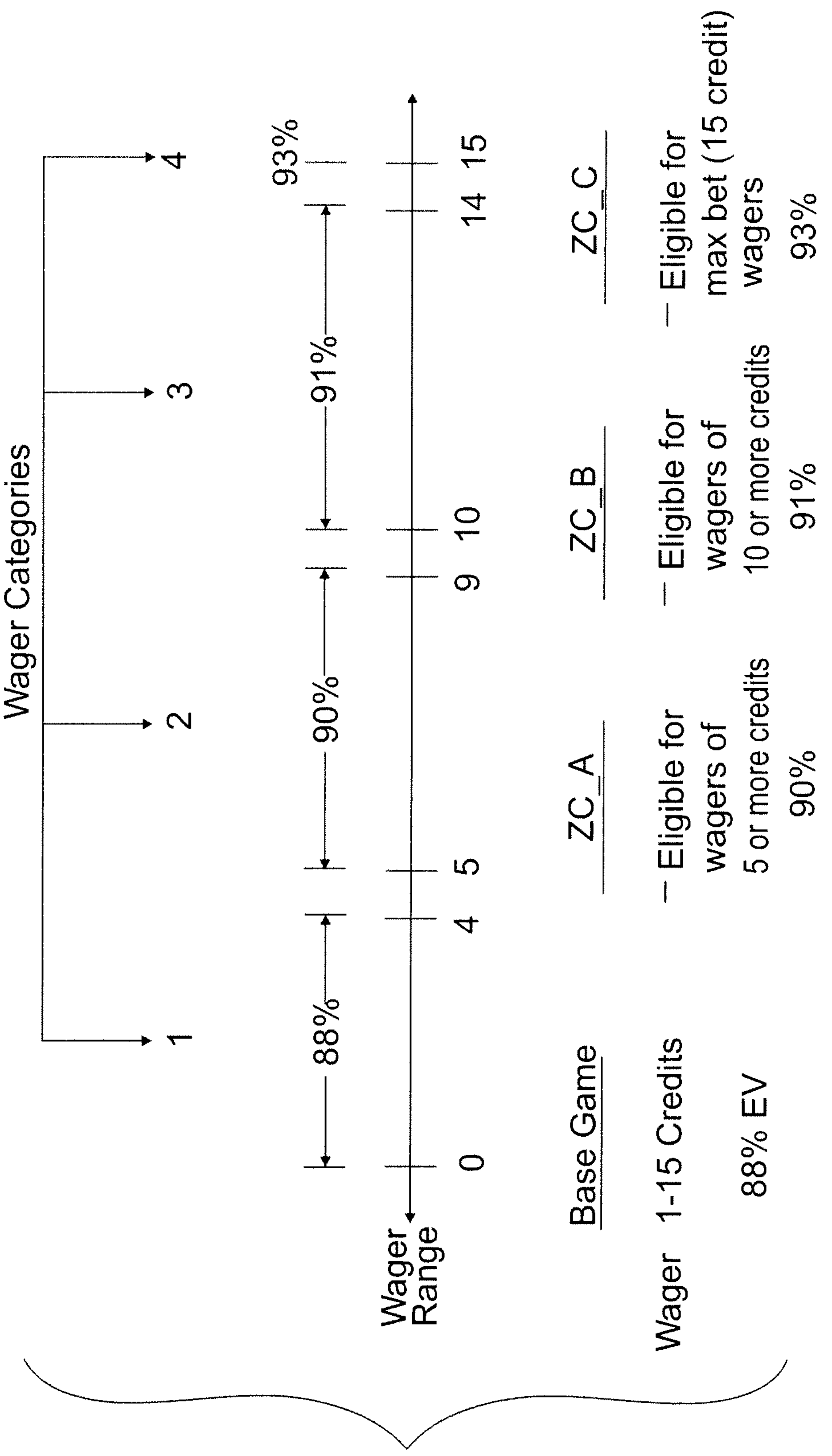
FIG. 10 is a diagram of wager categories created in association with various bet ranges for an example wagering game configuration having a base game and associated portal games.

A graphical representation of wager categories which can be created and used for metering by the system 500 is shown in FIG. 10. In FIG. 10, a range of wagers is shown which in this case is from zero to 15 credits. This corresponds to the range of allowable wagers on the base game (max bet of 15 credits). The operator has created a wagering game configuration in which a base game is activated along with three associated portal games. All three associated portal games (ZC_A, ZC_B, and ZC_C) are zero-cost portals, which do not require an additional side wager by the player. Thus, as seen in FIG. 10, the player's choices of wagers are anywhere between 1 and 15 credits. However, each of the zero-cost portal games has its own eligibility requirements. The first portal (ZC_A) requires a minimum bet of 5 credits in order for the player to be eligible. The second portal (ZC_B) requires a minimum bet of 10 credits in order for the player to be eligible. The third portal (ZC_C) requires a maximum wager of 15 credits in order for the player to be eligible.

Moreover, the base game and each of the portal games has an associated EV or expected value. When playing the base game alone, the EV of the base game is 88%. When playing the base game in concert with one or more of the zero-cost portals, the players overall payback percentage goes up as seen by the EVs shown in FIG. 10. However, in order to receive such increased overall payback percentages, the player must make wagers larger than the minimum bet to be eligible for the various portals.

The wager scale shown in FIG. 10 shows all possible wagers, along with a corresponding overall payback percentage for such wager ranges. If a player wagers 1, 2, 3, or 4 credits, he will only be eligible for the base game, and thus will receive an overall payback percentage which is the same as the base game payback percentage of 88%. If the player wagers 5, 6, 7, 8 or 9 credits, the player is eligible for the base game plus the first zero-cost portal (ZC_A), corresponding to an overall payback percentage of 90%. If the player wagers 10, 11, 12, 13, or 14 credits, the player is eligible for the base game and both the first and second portals (ZC_A and ZC_B), corresponding to an overall payback percentage of 91%. Finally if the player wagers 15 credits (a max bet) he is eligible for the base game and all three portals (ZC_A, ZC_B, and ZC_C), corresponding with an overall payback percentage of 91%. Thus, based upon the available wager range, four wager categories are created by the system. The first is for wagers between 1-4 credits. The second is for wagers between 5-10 credits. The third is for wagers between 11-14 credits. The fourth is for wagers of 15 credits. When a wager is received by the system, it is metered to the appropriate wager category as described herein.

An example accounting and metering performed by the system 500 is depicted in FIG. 11. The accounting and metering, as described herein, serves a function of providing a method for monetary reconciliation and for comparing actual expected values to theoretical expected values. In the example in FIG. 11, the wagering game configuration comprises a base game (BG), a zero cost portal (ZC_A), a first pay-for portal (PF_A) and a second pay-for portal (PF_B). The base game has a maximum wager of 15 credits, and thus a player can wager between 1 and 15 credits to play the base game. The EV of the base game is 88% as listed in the EV column in FIG. 11. The zero-cost portal (ZC_A) has an EV of 91% but a player is only eligible to participate in ZC_A if he or she makes a 15 credit max bet wager on the base game. The first pay-for portal (PF_A) allows can be activated with a bet of 1 or 2 credits at the players option. If the player wagers 1 credit on PF_A he gets an EV of 90%, while if he wagers 2 credits he gets an EV of 95%. Finally, the second pay-for portal (PF_B) can be activated with 1 credit (one wager option) and has an EV of 94%.

The table in FIG. 11 shows five wager categories created by the system corresponding to the various wagers that a player can make. The first wager category is for the base game only which applies for wagers of 1-14 credits. The second wager category is for the base game plus ZC_A which applies on max bet wagers of 15 credits. The third wager category is for a one credit wager on PF_A, and is labeled PF_A-WC1 signifying pay-for portal A, wager category 1. The fourth wager category is for a two credit wager on PF_A, and is labeled PF_A-WC2, signifying pay-for portal A, wager category 2. The fifth wager category is for a one credit wager on PF_B.

On a first wager ($1^{st}$ Bet), a player places a max bet wager on the base game, a 2 credit side wager on PF_A, and a 1 credit side wager on PF_B. Thus, the metering function of the system meters the wagers to the appropriate wager categories. The 15 credit wager on the base game is a max bet, and thus falls into wager category 2. The 2 credit wager on PF_A is metered to wager category 4. The 1 credit wager on PF_B is metered to wager category 5. On a second wager ($2^{nd}$ Bet), a player places a 9 credit wager on the base game, a 1 credit side wager on PF_A, and a 1 credit side wager on PF_B. Again the system meters the wagers to the proper wager categories. The 9 credit primary wager is metered to wager category 1. The 1 credit side bet on PF_A is metered to wager category 3. The 1 credit side bet on PF_B is metered to wager category 5. On a third wager ($3^{rd}$ Bet), the player wagers 10 credits on the base game and 2 credits on PF_A. The system meters the wagers accordingly. The 10 credit wager is metered to wager category 1. The 2 credit side wager on PF_A is metered to wager category 4.

A total of all wagers in each wager category is kept by the system, as seen in FIG. 11. Thus after three wagers, the total in each of the five wager categories is 19, 15, 1, 4, and 2 respectively. By keeping a total of each wager in each wager category, the system is capable of generating and calculating an overall payback percentage (or a theoretical total EV) of the system at any time. The overall payback percentage is calculated in accordance with Equation 2. Thus, after the three wagers are received, an overall payback percentage can be calculated as shown below:

$$OPP = \frac{(88\%)(19) + (90\%)(15) + (92\%)(1) + (90\%)(4) + (91\%)(2)}{41} = 89.17\%$$

Thus, after the first three wagers have been made, and a total of 41 credits has been received into the system, the theoretical overall payback percentage is 89.17%. Of course the system can continue to monitor the overall payback percentage as additional wagers are received and metered to the appropriate wager category, and the totals for each category are kept.

An actual payback percentage for the system is calculated by:

$$\text{Actual Payback Percentage} = \frac{\text{Coin Out}}{\text{Coin In}}$$

Thus, in the example in FIG. 11, after each wager is received, a play of the wagering game configuration is executed. The result of the play of the wagering game (and any associated active portals) may or may not result in an award being provided to the player. In an embodiment, the result is randomly selected. Suppose that on the first play of the wagering game (corresponding to the first wager), the player wins 25 credits. Suppose on the second play of the wagering game (corresponding to the second wager), the player wins nothing. Suppose that on the third play of the wagering game (corresponding to the third wager), the player wins 15 credits. Thus, after the first three plays of the game, the actual payback percentage is total coin out divided by total coin, which in this case is 40 credits out divided by 41 credits in, or 97.56%. Thus, at any time, the actual payback percentage can vary from the expected or theoretical overall payback percentage as seen in the example in FIG. 11. However, over many plays of the game, it is expected that the actual payback percentage will converge upon and come very close to the theoretical overall payback percentage. In this way, as seen in the example, the system can use the wager categories and aggregate metering therein to compare actual and theoretical values.

Each of these embodiments and obvious variations thereof is contemplated as falling within the spirit and scope of the claimed invention, which is set forth in the following claims.

What is claimed is:

1. A method of operating a wagering game comprising:

receiving, using a controller, one or more configuration inputs to create at least one wagering game configuration for a gaming device, the at least one wagering game configuration comprising at least one base game and at least one portal game, the at least one base game operable in response to receipt of a primary wager, the at least one portal game having a set of eligibility criteria and being activated through play of the at least one base game;

storing in a memory storage device a plurality of distinct wager categories based upon the set of eligibility criteria and a size of the primary wager, wherein a first of the wager categories defines a range of allowable wagers for the primary wager and includes a first meter and a first paytable having a first expected value corresponding to the base game of the at least one wagering game configuration, the range extending between minimum and maximum allowable wagers, and wherein a second of the wager categories defines a minimum portal eligibility amount for the portal game and includes a second meter, a second paytable distinct from the first paytable, and a second expected value corresponding to the base game and the portal game of the at least one wagering game configuration, wherein the second expected value is a function of the first expected value and an expected value of the second paytable that differs from the first expected value;

using the controller or another controller, activating participation in the at least one portal game if the set of eligibility criteria is satisfied, and responsive thereto, metering the entire primary wager to the second wager category by adding the entire primary wager to the second meter;

if the eligibility criteria is not satisfied for any of the at least one portal game, metering, using the controller or another controller, the entire primary wager to the first wager category by adding the entire primary wager to the first meter;

calculating, using the controller or another controller, a theoretical overall payback percentage for the at least one wagering game configuration of the gaming device based upon at least the entire primary wager, the first expected value, the second expected value, an amount in the first meter, and an amount in the second meter;

calculating, using the controller or another controller, an actual payback percentage for the at least one wagering game configuration of the gaming device; and comparing, using the controller or another controller, the theoretical overall payback percentage with the actual payback percentage.

2. The method of claim 1, wherein the at least one portal game is a zero-cost portal game.

3. The method of claim 2, wherein the set of eligibility criteria includes the primary wager being equal to or greater than the minimum portal eligibility amount.

4. The method of claim 3, wherein the minimum portal eligibility amount is greater than the minimum allowable wager.

5. The method of claim 3, wherein the minimum portal eligibility amount is equal to the maximum allowable wager.

6. The method of claim 1, wherein the minimum portal eligibility amount corresponds to a percentage of the primary wager.

7. The method of claim 1, wherein the minimum portal eligibility amount corresponds to a side wager for the portal game.

8. The method of claim 1, wherein the at least one portal game is a pay-for portal game.

9. The method of claim 8, further comprising receiving a side wager, and in response thereto, activating the at least one portal game, the method further comprising metering, using the controller or another controller, the side wager to a third category of the wager categories that includes a third meter by adding the side wager to the third meter.

10. A gaming system comprising:

a plurality of gaming devices in communication with a control computer, the control computer in communication with at least one memory storage device;

at least one wagering game configuration stored on the at least one memory storage device, the at least one wagering game configuration comprising a base game and at least one portal game for a first of the gaming devices, the at least one portal game being activated through play of the base game;

at least one controller operative to:

receive a plurality of distinct wager categories associated with the at least one wagering game configuration, wherein a first of the wager categories defines a range of allowable wagers for a primary wager for the base game and includes a first meter and a first paytable having a first expected value corresponding to the base game, the range extending between minimum and maximum allowable wagers, and wherein a second of the wager categories defines a minimum portal eligibility amount for the portal game and includes a second meter, a second paytable distinct from the first paytable, and a second expected value corresponding to the base game and the portal game, wherein the second expected value is a function of the first expected value and an expected value of the second paytable that differs from the first expected value;

receive from at least one player a size of a primary wager amount within the range of allowable wagers;

if the set of eligibility criteria is satisfied, assign the entire primary wager amount to the second wager category by adding the entire primary wager to the second meter;

if the set of eligibility is not satisfied for any of the at least one portal game, assign the entire primary wager amount to the first wager category by adding the entire primary wager to the first meter;

add the size of the primary wager amount to a credit in meter associated with the wager category to which the primary wager amount was assigned;

calculate a theoretical overall payback percentage for the at least one wagering game configuration of the first gaming device based upon at least the entire primary wager, the first expected value, the second expected value, an amount in the first meter, and an amount in the second meter;

calculate an actual payback percentage for the at least one wagering game configuration of the first gaming device; and compare the theoretical overall payback percentage with the actual payback percentage.

11. The system of claim 10, wherein the at least one controller is further operative to receive a second size of a secondary wager amount collected from the at least one player, and in response thereto, activate the at least one portal game.

12. The system of claim 10, wherein the plurality of wager categories are created commensurate with creation of the at least one wagering game configuration and stored in memory.

13. The system of claim 10, wherein the at least one controller is further operative to maintain a balance of credits metered to each of the plurality of wager categories.

14. The system of claim 13, wherein the at least one controller is further operative to calculate a theoretical overall expected value for the wagering game configuration based upon the balance of credits metered to each of the plurality of wager categories.

15. A non-transitory computer readable storage medium encoded with instructions for carrying out a method of aggregate metering for monetary reconciliation in a gaming system including a plurality of gaming terminals, the method performing the steps of:

receiving a wagering game configuration for a first of the gaming terminals, the wagering game configuration comprising at least one base game and at least one portal game that is activated through play of the at least one base game;

in response to receiving the wagering game configuration, generating and storing a plurality of distinct wager categories associated with the wagering game configuration, wherein a first of the wager categories corresponds to at least the base game and includes a first meter and a first paytable having a first expected value corresponding to the at least one base game, and wherein a second of the wager categories corresponds to at least the at least one portal game and includes a second meter, a second paytable distinct from the first paytable, and a second expected value corresponding to the at least one base game and the at least one portal game, wherein the second expected value is a function of the first expected value and an expected value of the second paytable that differs from the first expected value;

receiving an input of a primary wager amount associated with play of the at least one base game at the first gaming terminal, the first wager category defining a range of allowable wagers for the primary wager, the range extending between minimum and maximum allowable wagers;

adding the entire primary wager amount to the first or second meters depending upon whether a set of eligibility criteria is satisfied for the at least one portal game;

calculating a theoretical overall payback percentage for the wagering game configuration of the gaming terminal based upon at least an amount in the first meter, an amount in the second meter, the first expected value, and the second expected value;

calculating an actual payback percentage for the wagering game configuration of the gaming terminal; and comparing the actual payback percentage with the theoretical overall payback percentage.

16. The computer readable storage medium of claim 15, wherein the method further performs the step of receiving a second input of a secondary wager amount associated with play of the at least one portal game.

17. The computer readable storage medium of claim 16, wherein the calculating the theoretical overall payback percentage is further based upon a size of the secondary wager.

18. The computer readable storage medium of claim 15, wherein the method further performs the step of generating a PAR sheet associated with the wagering game configuration, the PAR sheet dependent upon the primary wager amount.

19. The computer readable storage medium of claim 18, wherein the method further performs the step of causing an output device to display the PAR sheet, print the PAR sheet, or both.

* * * * *